(12) United States Patent
Banerjee et al.

(10) Patent No.: US 10,162,816 B1
(45) Date of Patent: Dec. 25, 2018

(54) COMPUTERIZED SYSTEM AND METHOD FOR AUTOMATICALLY TRANSFORMING AND PROVIDING DOMAIN SPECIFIC CHATBOT RESPONSES

(71) Applicant: OATH INC., New York, NY (US)

(72) Inventors: Siddhartha Banerjee, Sunnyvale, CA (US); Prakhar Biyani, Sunnyvale, CA (US); Kostas Tsioutsiouliklis, Sunnyvale, CA (US)

(73) Assignee: OATH INC., New York, NY (US)

( * ) Notice: Subject to any disclaimer, the term of this patent is extended or adjusted under 35 U.S.C. 154(b) by 0 days.

(21) Appl. No.: 15/623,668

(22) Filed: Jun. 15, 2017

(51) Int. Cl.
*G06F 17/27* (2006.01)
*H04L 29/08* (2006.01)
*H04L 12/58* (2006.01)

(52) U.S. Cl.
CPC .......... *G06F 17/279* (2013.01); *G06F 17/274* (2013.01); *G06F 17/2705* (2013.01); *G06F 17/277* (2013.01); *H04L 51/02* (2013.01); *H04L 67/36* (2013.01)

(58) Field of Classification Search
CPC ...... G06F 17/2881; G06F 17/20; G06F 17/21; G06F 17/248; G06F 17/27; G06F 17/2795
USPC .................................................. 704/9, 1, 10
See application file for complete search history.

(56) References Cited

U.S. PATENT DOCUMENTS

| 2009/0327224 | A1* | 12/2009 | White | G06F 17/30864 |
| 2010/0076947 | A1* | 3/2010 | Kurapat | G06F 17/30321 707/706 |
| 2014/0337306 | A1* | 11/2014 | Gramatica | G06F 17/30731 707/706 |
| 2016/0224569 | A1* | 8/2016 | Cuddihy | G06F 17/3064 |

OTHER PUBLICATIONS

Bamman et al., "Learning Latent Personas of Film Characters," 11 pages (2014).
Banerjee et al., "Transforming Chatbot Responses to Mimic Domain-specific Linguistic Styles," 8 pages (2016).
(Continued)

*Primary Examiner* — Qi Han
(74) *Attorney, Agent, or Firm* — James J. DeCarlo; Greenberg Traurig, LLP

(57) ABSTRACT

Disclosed are systems and methods for improving interactions with and between computers in content searching, generating, hosting and/or providing systems supported by or configured with personal computing devices, servers and/or platforms. The disclosure provides a computerized framework for automatically generating chatbot responses to produce domain-specific responses that mimic native styles unique to particular domains. The disclosed systems and methods construct domain-specific word-graphs based on account activity from specific domains and generate word-patterns. New words obtained from the patterns in the graph are introduced to transform the regular response. The graph is then pruned using data-driven thresholds in order to avoid spurious transformations, and paragraph vectors are also utilized to assign relevance scores to generated patterns such that only the patterns that are contextually similar to the
(Continued)

original response (generic/regular response) are used. As result, the regular chatbot response is rewritten using an optimized set of patterns.

19 Claims, 8 Drawing Sheets

(56) References Cited

OTHER PUBLICATIONS

Bruijnes et al., "Virtual Suspect William," Springer International Publishing Switzerland, pp. 67-76 (2015).

Duplessis et al., "Joker Chatterbot Re-Wochat 2016—Shared Task Chatbot Description Report," 2 pages (2016).

Fialho et al., "Meet Edgar, a tutoring agent at Monserrate," 6 pages (2013).

Filippova, Katja, "Multi-Sentence Compression: Finding Shortest Paths in Word Graphs," Proceedings of the 23rd International Conference on Computational Linguistics, pp. 322-330 (2010).

Kubon et al., "Politician Re-Wochat 2016—Shared Task Chatbot Description Report," 2 pages (2016).

Le et al., "Distributed Representations of Sentences and Documents," 9 pages (2015).

Li et al., "A Persona-Based Neural Conversation Model," 10 pages, (2016).

Loper et al., "NLTK: The National Language Toolkit," 8 pages (2002).

McCrae et al., "The Five-Factor Theory of Personality," Theoretical Perspectives, pp. 159-181 (2008).

Owoputi et al., "Improved Part-of-Speech Tagging for Online Conversational Text with Word Clusters," 13 pages (2013).

Rehurek et al., "Software Framework for Topic Modelling with Large Corpora," 5 pages (2016).

Rushforth et al., "Varying Personality in Spoken Dialogue with a Virtual Human," 13 pages (2009).

Thelwall, Mike; "Heart and Soul: Sentiment Strength Detection in the Social Web with SentiStrength," Holyst, J (Ed). Cyberemotions, 14 pages (2016).

\* cited by examiner

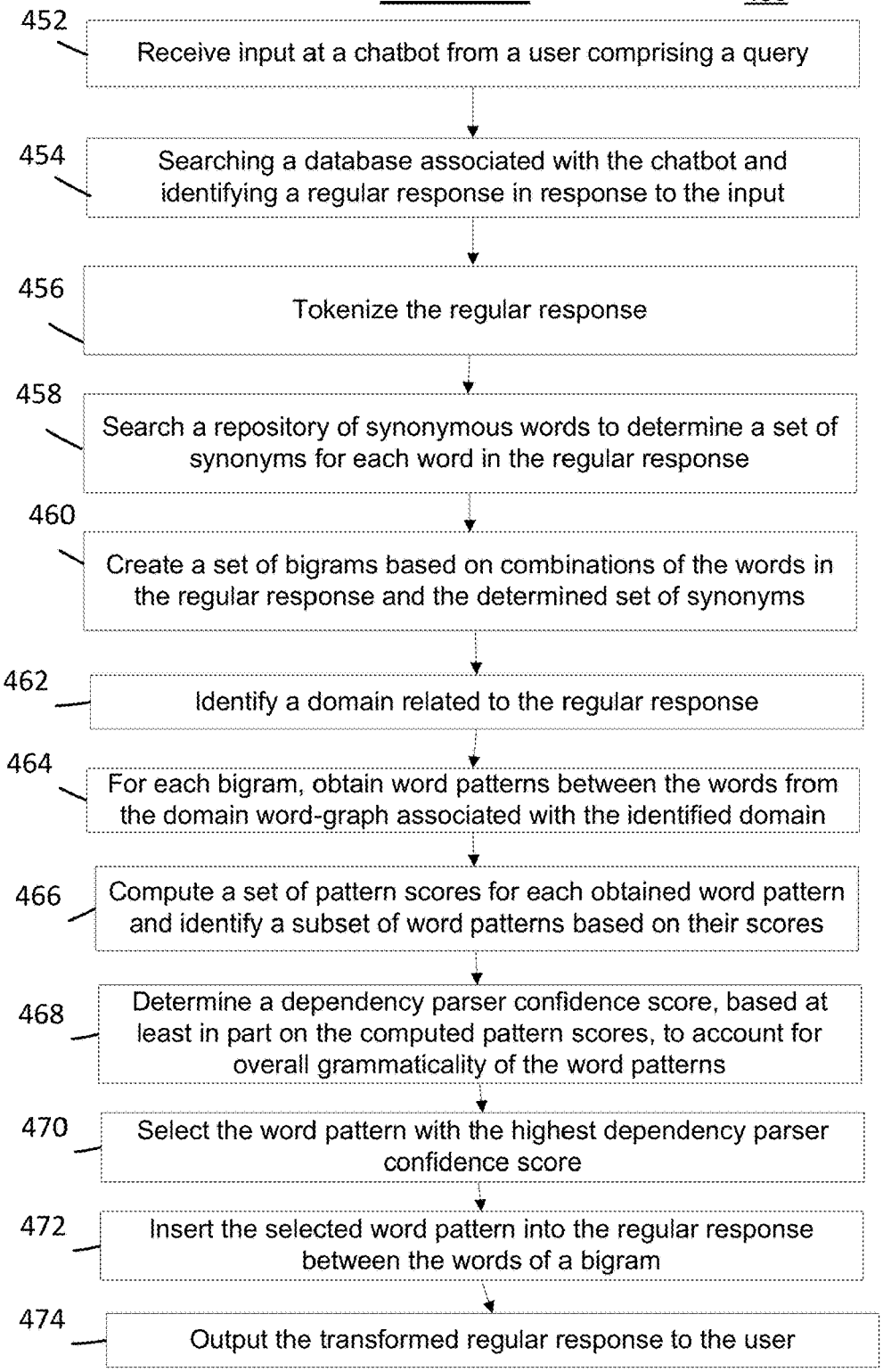

FIG. 5
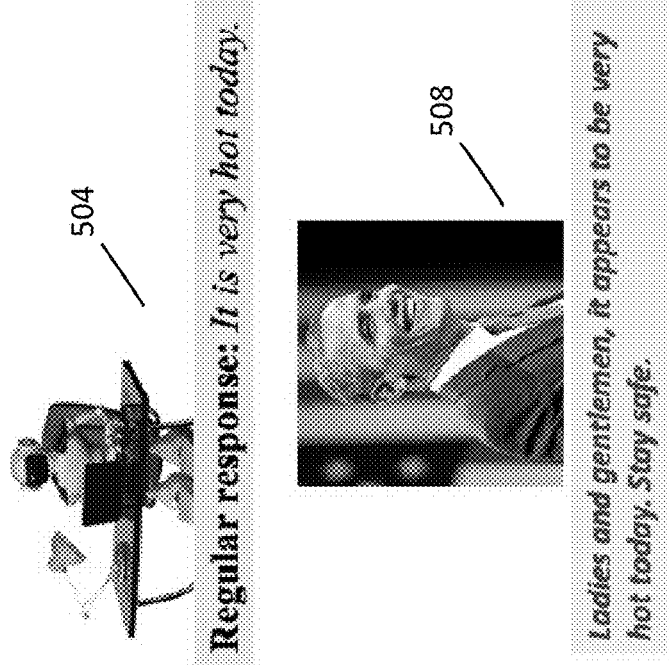
502 — How is the weather?
504 — Regular response: It is very hot today.
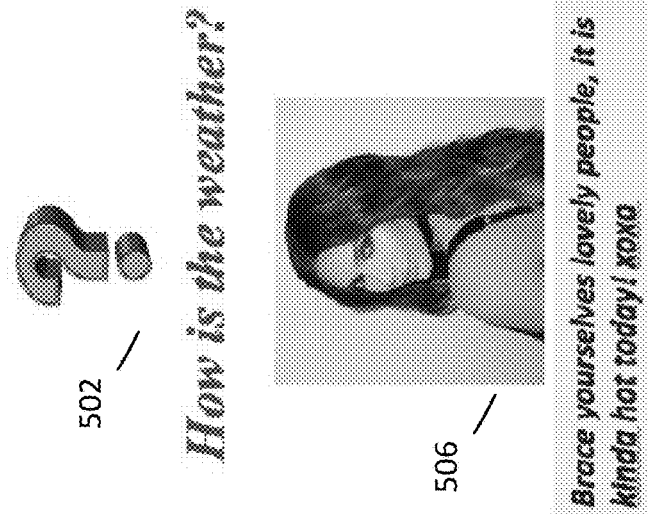
506 — Brace yourselves lovely people, it is kinda hot today! xoxo
508 — Ladies and gentlemen, it appears to be very hot today. Stay safe.

COMPUTERIZED SYSTEM AND METHOD FOR AUTOMATICALLY TRANSFORMING AND PROVIDING DOMAIN SPECIFIC CHATBOT RESPONSES

This application includes material that is subject to copyright protection. The copyright owner has no objection to the facsimile reproduction by anyone of the patent disclosure, as it appears in the Patent and Trademark Office files or records, but otherwise reserves all copyright rights whatsoever.

FIELD

The present disclosure relates generally to improving the performance of content searching, generating, providing and/or hosting computer devices, systems and/or platforms by modifying the capabilities and providing non-native functionality to such devices, systems and/or platforms for a novel and improved framework for automatically generating and/or transforming chatbot responses to produce domain-specific responses that mimic native styles unique to particular domains.

SUMMARY

With the tremendous growth in the field of Artificial Intelligence (AI), chatbots have become very popular tools on the internet for users to interact with network platforms. Chatbots, as understood by those of skill in the art, are computer programs that execute to conduct conversations with users via auditory or textual methods. Such programs are designed to convincingly simulate how a human would behave as a conversational partner, thereby passing the Turing test. Chatbots (also referred to as "chatterbots" interchangeably) are typically used in dialog systems for various practical purposes including, for example, customer service or information acquisition. Chatbots can utilize sophisticated natural language processing techniques or mechanisms, and also can scan for keywords within an input, then pull a reply with the most matching keywords, or the most similar wording pattern from a database. Conventional chatbots are part of virtual assistants such as Google® Assistant, and are accessed by many organizations applications, websites and on instant messaging platforms, such as Facebook Messenger®.

As such, there is a growing interest in building end-to-end conversational systems; however, recent development in AI and/or machine learning technologies have fell short in enabling chatbots to generate responses that mimic specific speaking styles of personalities. For example, some existing systems simply attempt to produce chatbot responses in order for them to model human personas, which is restricted to general human-like behavior and not specific persona styles.

The disclosed systems and methods provide a novel framework that simultaneously provides for chatbot responses to embody accurate answers to questions asked to the conversational agent while also transforming these regular responses and/or generating new responses that mimic styles specific to particular domains with which users can relate and are acquainted. For example, a user interested in fashion or entertainment would enjoy getting bot responses resembling the speaking styles of fashionistas or entertainers, respectively.

Accordingly, in one or more embodiments, a method is disclosed for a novel, computerized framework for automatically generating and/or transforming chatbot responses to produce domain-specific responses that mimic native styles unique to particular domains (e.g., communities of similar personalities such as, for example, politicians, singers, and the like). The instant disclosure provides for computerized techniques to construct domain-specific word-graphs using tweets posted from Twitter® accounts (and/or any other type of network accessible platform/resource that enables learning/training of a system to understand language styles) that belong to users from specific domains, and use the graph to generate word-patterns. As discussed in more detail below, new words (obtained from the patterns in the graph) are introduced to transform the regular response.

In some embodiments, the graph can be pruned (e.g., filtered, parsed, scraped and the like, as discussed in more detail below) using data-driven thresholds (e.g., such as co-occurrence, contextual similarity and linguistic quality metrics) in order to avoid spurious transformations. In some embodiments, paragraph (or other types of grammatical identifiers) vectors are also utilized to assign relevance scores to generate word patterns, such that only the patterns that are contextually similar to the original response (generic/regular response) are used. As result, only the best, most optimized set of patterns are used to rewrite the regular chatbot response.

In accordance with one or more embodiments, a non-transitory computer-readable storage medium is provided, the non-transitory computer-readable storage medium tangibly storing thereon, or having tangibly encoded thereon, computer readable instructions that when executed cause at least one processor to perform a method for a novel and improved framework for automatically generating and/or transforming chatbot responses to produce domain-specific responses that mimic native styles unique to particular domains.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code (or program logic) executed by a processor(s) of a computing device to implement functionality in accordance with one or more such embodiments is embodied in, by and/or on a non-transitory computer-readable medium.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure:

FIGS. 4A-4B are flowcharts illustrating steps performed in accordance with some embodiments of the present disclosure;

FIG. 5 illustrates non-limiting example embodiments of the disclosed systems and methods in accordance with some embodiments of the present disclosure;

DESCRIPTION OF EMBODIMENTS

Figure 1:
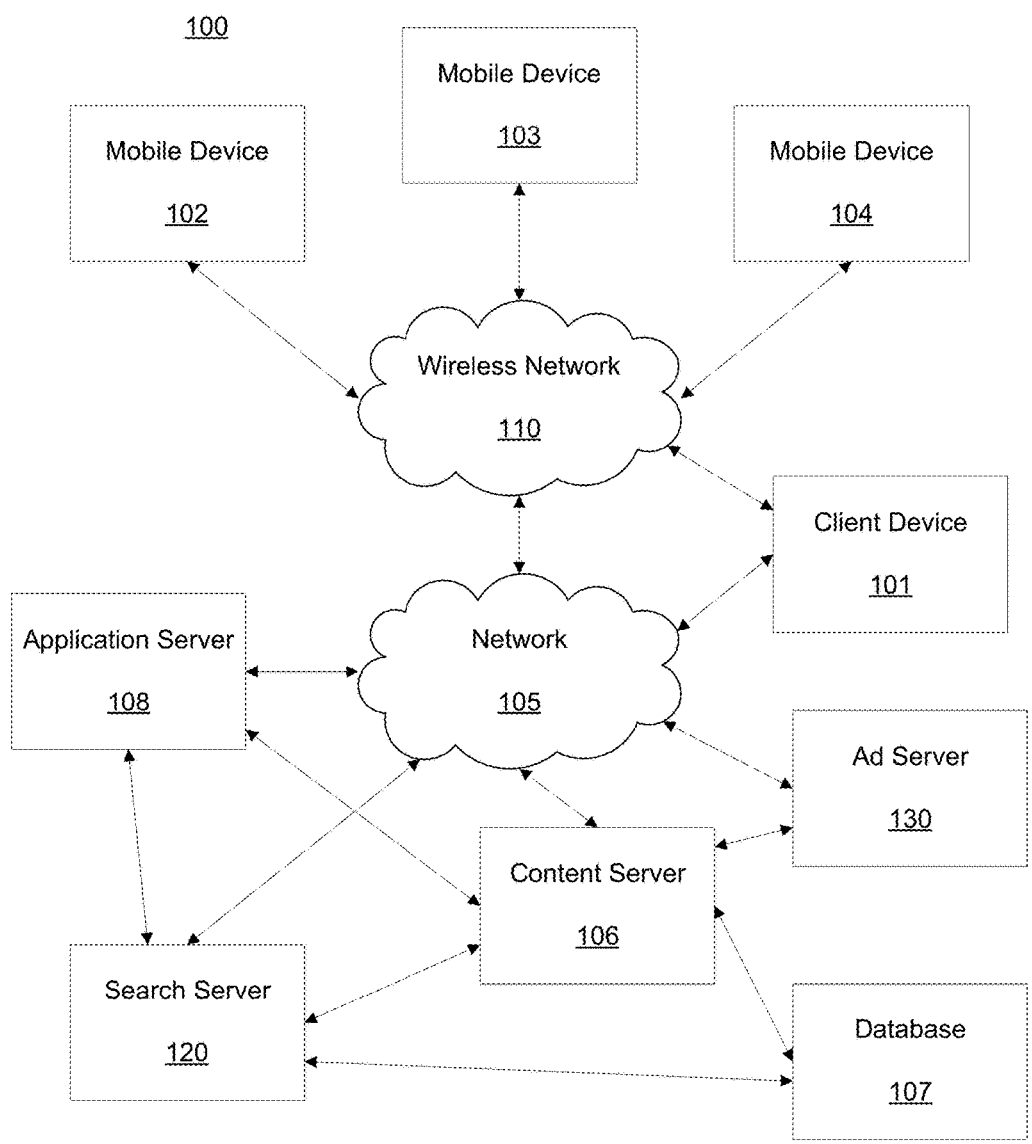
FIG. 1 is a schematic diagram illustrating an example of a network within which the systems and methods disclosed herein could be implemented according to some embodiments of the present disclosure.

The present disclosure will now be described more fully hereinafter with reference to the accompanying drawings, which form a part hereof, and which show, by way of illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

These computer program instructions can be provided to a processor of: a general purpose computer to alter its function to a special purpose; a special purpose computer; ASIC; or other programmable digital data processing apparatus, such that the instructions, which execute via the processor of the computer or other programmable data processing apparatus, implement the functions/acts specified in the block diagrams or operational block or blocks, thereby transforming their functionality in accordance with embodiments herein.

For the purposes of this disclosure a computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a wired or wireless line or link, for example.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly.

A wireless network may further employ a plurality of network access technologies, including Wi-Fi, Long Term Evolution (LTE), WLAN, Wireless Router (WR) mesh, or 2nd, 3rd, or 4th generation (2G, 3G, 4G or 5G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For purposes of this disclosure, a client (or consumer or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device may vary in terms of capabilities or features. Claimed subject matter is intended to cover a wide range of potential variations. For example, a simple smart phone, phablet or tablet may include a numeric keypad or a display of limited functionality, such as a monochrome liquid crystal display (LCD) for displaying text. In contrast, however, as another example, a web-enabled client device may include a high-resolution screen, one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

A client device may include or may execute a variety of operating systems, including a personal computer operating system, such as a Windows, iOS or Linux, or a mobile operating system, such as iOS, Android, or Windows Mobile, or the like.

A client device may include or may execute a variety of possible applications, such as a client software application enabling communication with other devices, such as communicating one or more messages, such as via email, for example Yahoo! ® Mail, short message service (SMS), or multimedia message service (MMS), for example Yahoo!Messenger®, including via a network, such as a social network, including, for example, Tumblr®, Facebook®, LinkedIn®, Twitter®, Flickr®, or Google+®, Instagram®, to provide only a few possible examples. A client device may also include or execute an application to communicate content, such as, for example, textual content, multimedia content, or the like. A client device may also include or execute an application to perform a variety of possible tasks, such as browsing, searching, playing, streaming or displaying various forms of content, including locally stored or uploaded images and/or video, or games (such as fantasy sports leagues). The foregoing is provided to illustrate that claimed subject matter is intended to include a wide range of possible features or capabilities.

As discussed herein, reference to an "advertisement" should be understood to include, but not be limited to, digital media content embodied as a media item that provides information provided by another user, service, third party, entity, and the like. Such digital ad content can include any type of known or to be known media renderable by a computing device, including, but not limited to, video, text, audio, images, and/or any other type of known or to be known multi-media item or object. In some embodiments, the digital ad content can be formatted as hyperlinked multi-media content that provides deep-linking features and/or capabilities. Therefore, while some content is referred to as an advertisement, it is still a digital media item that is renderable by a computing device, and such digital media item comprises content relaying promotional content provided by a network associated party.

The principles described herein may be embodied in many different forms. The present disclosure provides a novel, computerized framework that automatically transforms chatbot responses into domain-specific responses that mimic native styles unique to particular domains. The disclosed systems and methods addresses the problem of transforming factual chatbot responses (referred to as regular response) to a modified response that is compatible with a domain-specific communication style—for example, speaking or language styles (or patterns) of politicians. The goal of the disclosed systems and methods is to preserve the content of the original response, but alter its style by replacing existing word sequences in regular chatbot responses with determined stylized words or word sequences, thereby mimicking domain-specific styles.

By way of background, conventional conversational agents have recently received major attention from researchers, especially from the perspective of Natural Language Generation (NLG). Receiving accurate responses from a chatbot is essential; however, bots that have functionality for mimicking personas or specific speaking styles are absent in the field. As evidenced from the discussion herein, having such functionality can enable a website or network location (e.g., application, service or platform) to increase its capability of retaining its users, in that providing users with accurate, stylized responses can address the needs of a user's requests and entertainment value.

For example, one conventional attempt to mimic human-like conversations is to use a persona-model using a deep neural-network model. However, such system does not differentiate between speakers from different domains and does not generate text conforming to specific speaking styles. In contrast to these systems, the instant disclosure does not generate responses in conversations, but modifies regular responses to fit domain-specific styles, as discussed in more detail below.

In another example, some systems' chat and virtual agents select the best possible response from a list of pre-populated responses and templates. And, some systems model responses based on "five-factor personalities" in order to model characters; however, such systems are focused solely on a response perceiving personality traits of a character rather than persona-based content generation.

In contrast to the above-mentioned approaches, the disclosed systems and methods provide a novel computerized response generation environment that is completely data-driven with the purpose of transforming regular responses (e.g., original factual responses as in conventional systems) by modifying them to include stylized content specific to a particular domain without relying on predefined responses or templates. Therefore, according to embodiments of the instant disclosure, the disclosed systems and methods provide a novel end-to-end conversational engine that provides chatbot responses that accurately and factually answers questions with responses that mimic styles specific to particular domains.

For purposes of this disclosure, the discussed embodiments will center-around two domains and styles—politics and entertainment; however, it should not be construed as limiting, as any type of domain/style can be utilized and/or leveraged in producing the generated stylized responses discussed herein. For example, such domains/styles can also include, but are not limited to, fashion, business, regional (country, northeastern, Boston accents/cadences, and the like), slang, elementary, adult, radio hosts, singers, actors, sports figures, commentators, and the like, or some combination thereof.

According to embodiments of the instant disclosure, as discussed in more detail below, a user enters a query with a chatbot asking for a particular piece of content/information. For example, "What is the weather today?" In response to this query, the disclosed systems and methods will retrieve the accurate/factual response (e.g., "The weather in New York City is 72 degrees and Sunny.") However, instead of simply outputting this response, as in conventional systems, the disclosed systems and methods automatically transform the initial chatbot response to produce domain-specific response that mimics a native style unique to the particular domain from which the query was entered. Therefore, since the user entered the query from a domain, for example, associated with a news source (e.g., cnn.com, which provides political analysis), the response can be stylized according to a political undertone such that it includes the type of rhetoric a politician would use when answering a question. For example, as a politician would typically say, the chatbot response can be modified to state "Good afternoon Sir, the weather today in the Big Apple appears to be 72 degrees and Sunny, hope you enjoy your day." Thus, the transformed response retains the factual content but adds a distinctive style easily identifiable and attributable to a specific domain.

As discussed in more detail below at least in relation to FIG. 6, according to some embodiments, information associated with, derived from, or otherwise identified from, during or as a result of generated chatbot response, as discussed herein, can be used for monetization purposes and targeted advertising when providing, delivering or enabling devices access or output a response. Providing targeted advertising to users associated with such discovered content can lead to an increased click-through rate (CTR) of such ads and/or an increase in the advertiser's return on investment (ROI) for serving such content provided by third parties (e.g., digital advertisement content provided by an advertiser, where the advertiser can be a third party advertiser, or an entity directly associated with or hosting the systems and methods discussed herein).

Certain embodiments will now be described in greater detail with reference to the figures. In general, with reference to FIG. 1, a system 100 in accordance with an embodiment of the present disclosure is shown. FIG. 1 shows components of a general environment in which the systems and methods discussed herein may be practiced. Not all the components may be required to practice the disclosure, and variations in the arrangement and type of the components may be made without departing from the spirit or scope of the disclosure. As shown, system 100 of FIG. 1 includes local area networks ("LANs")/wide area networks ("WANs")—network 105, wireless network 110, mobile devices (client devices) 102-104 and client device 101. FIG. 1 additionally includes a variety of servers, such as content server 106, application (or "App") server 108, search server 120 and advertising ("ad") server 130.

One embodiment of mobile devices 102-104 is described in more detail below. Generally, however, mobile devices 102-104 may include virtually any portable computing device capable of receiving and sending a message over a network, such as network 105, wireless network 110, or the like. Mobile devices 102-104 may also be described generally as client devices that are configured to be portable. Thus, mobile devices 102-104 may include virtually any portable computing device capable of connecting to another computing device and receiving information. Such devices include multi-touch and portable devices such as, cellular telephones, smart phones, display pagers, radio frequency (RF) devices, infrared (IR) devices, Personal Digital Assistants (PDAs), handheld computers, laptop computers, wearable computers, smart watch, tablet computers, phablets, integrated devices combining one or more of the preceding devices, and the like. As such, mobile devices 102-104 typically range widely in terms of capabilities and features. For example, a cell phone may have a numeric keypad and a few lines of monochrome LCD display on which only text may be displayed. In another example, a web-enabled mobile device may have a touch sensitive screen, a stylus, and an HD display in which both text and graphics may be displayed.

A web-enabled mobile device may include a browser application that is configured to receive and to send web pages, web-based messages, and the like. The browser application may be configured to receive and display graphics, text, multimedia, and the like, employing virtually any web based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), Dynamic HyperText Markup Language (DHTML), eXtensible Markup Language (XML), and the like, to display and send a message.

Mobile devices 102-104 also may include at least one client application that is configured to receive content from another computing device. The client application may include a capability to provide and receive textual content, graphical content, audio content, and the like. The client application may further provide information that identifies itself, including a type, capability, name, and the like. In one embodiment, mobile devices 102-104 may uniquely identify themselves through any of a variety of mechanisms, including a phone number, Mobile Identification Number (MIN), an electronic serial number (ESN), or other mobile device identifier.

In some embodiments, mobile devices 102-104 may also communicate with non-mobile client devices, such as client device 101, or the like. In one embodiment, such communications may include sending and/or receiving messages, searching for, viewing and/or sharing photographs, audio clips, video clips, or any of a variety of other forms of communications. Client device 101 may include virtually any computing device capable of communicating over a network to send and receive information. The set of such devices may include devices that typically connect using a wired or wireless communications medium such as personal computers, multiprocessor systems, microprocessor-based or programmable consumer electronics, network PCs, or the like. Thus, client device 101 may also have differing capabilities for displaying navigable views of information.

Client devices 101-104 computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

Wireless network 110 is configured to couple mobile devices 102-104 and its components with network 105. Wireless network 110 may include any of a variety of wireless sub-networks that may further overlay stand-alone ad-hoc networks, and the like, to provide an infrastructure-oriented connection for mobile devices 102-104. Such sub-networks may include mesh networks, Wireless LAN (WLAN) networks, cellular networks, and the like.

Network 105 is configured to couple content server 106, application server 108, or the like, with other computing devices, including, client device 101, and through wireless network 110 to mobile devices 102-104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another, and/or other computing devices.

Within the communications networks utilized or understood to be applicable to the present disclosure, such networks will employ various protocols that are used for communication over the network. Signal packets communicated via a network, such as a network of participating digital communication networks, may be compatible with or compliant with one or more protocols. Signaling formats or protocols employed may include, for example, TCP/IP, UDP, QUIC (Quick UDP Internet Connection), DECnet, NetBEUI, IPX, APPLETALK™, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

According to some embodiments, the present disclosure may also be utilized within or accessible to an electronic social networking site. A social network refers generally to an electronic network of individuals, such as, but not limited to, acquaintances, friends, family, colleagues, or co-workers, that are coupled via a communications network or via a variety of sub-networks. Potentially, additional relationships may subsequently be formed as a result of social interaction via the communications network or sub-networks. In some embodiments, multi-modal communications may occur between members of the social network. Individuals within one or more social networks may interact or communication with other members of a social network via a variety of devices. Multi-modal communication technologies refers to a set of technologies that permit interoperable communication across multiple devices or platforms, such as cell phones, smart phones, tablet computing devices, phablets, personal computers, televisions, set-top boxes, SMS/MMS, email, instant messenger clients, forums, social networking sites, or the like.

In some embodiments, the disclosed networks 110 and/or 105 may comprise a content distribution network(s). A "content delivery network" or "content distribution network" (CDN) generally refers to a distributed content delivery system that comprises a collection of computers or computing devices linked by a network or networks. A CDN may employ software, systems, protocols or techniques to facilitate various services, such as storage, caching, communication of content, or streaming media or applications. A CDN may also enable an entity to operate or manage another's site infrastructure, in whole or in part.

The content server 106 may include a device that includes a configuration to provide content via a network to another device. A content server 106 may, for example, host a site, service or an associated application, such as, an email or messaging platform (e.g., Yahoo!® Mail), a social networking site, a photo sharing site/service (e.g., Tumblr®), a search platform or site, or a personal user site (such as a blog, vlog, online dating site, and the like) and the like. A content server 106 may also host a variety of other sites, including, but not limited to business sites, educational sites, dictionary sites, encyclopedia sites, wikis, financial sites, government sites, and the like. Devices that may operate as content server 106 include personal computers desktop computers, multiprocessor systems, microprocessor-based or programmable consumer electronics, network PCs, servers, and the like. Likewise, the search server 120 may include a device that includes a configuration to provide content via a network to another device.

In some embodiments, the content server 106 (and/or other servers 108, 120 and 130, for example), can host the chatbot engine 300 discussed below that enables the content provided by such server(s) to be transformed/generated according the disclosed systems and methods discussed herein.

Content server 106 can further provide a variety of services that include, but are not limited to, streaming and/or downloading media services, search services, email services, photo services, web services, social networking services, news services, third-party services, audio services, video services, instant messaging (IM) services, SMS services, MMS services, FTP services, voice over IP (VOIP) services, or the like. Such services, for example a mail application and/or email-platform, can be provided via the application server 108, whereby a user is able to utilize such service upon the user being authenticated, verified or identified by the service. Examples of content may include videos, text, audio, images, or the like, which may be processed in the form of physical signals, such as electrical signals, for example, or may be stored in memory, as physical states, for example.

In a similar manner as the content server 106, the search server 120 may include a device that includes a configuration to provide content via a network to another device. The search server 120 can, for example, host a site, service or an associated application, such as, an search engine (e.g., Yahoo! ® Search, Bing®, Google Search®, and the like), a social networking site, a photo sharing site/service (e.g., Tumblr®), and the like. Additionally, the search server 120 can further provide a variety of services similar to those outlined above for the content server 106.

An ad server 130 comprises a server that stores online advertisements for presentation to users. "Ad serving" refers to methods used to place online advertisements on websites, in applications, or other places where users are more likely to see them, such as during an online session or during computing platform use, for example. Various monetization techniques or models may be used in connection with sponsored advertising, including advertising associated with user. Such sponsored advertising includes monetization techniques including sponsored search advertising, non-sponsored search advertising, guaranteed and non-guaranteed delivery advertising, ad networks/exchanges, ad targeting, ad serving and ad analytics. Such systems can incorporate near instantaneous auctions of ad placement opportunities during web page creation, (in some cases in less than 500 milliseconds) with higher quality ad placement opportunities resulting in higher revenues per ad. That is advertisers will pay higher advertising rates when they believe their ads are being placed in or along with highly relevant content that is being presented to users. Reductions in the time needed to quantify a high quality ad placement offers ad platforms competitive advantages. Thus higher speeds and more relevant context detection improve these technological fields.

For example, a process of buying or selling online advertisements may involve a number of different entities, including advertisers, publishers, agencies, networks, or developers. To simplify this process, organization systems called "ad exchanges" may associate advertisers or publishers, such as via a platform to facilitate buying or selling of online advertisement inventory from multiple ad networks. "Ad networks" refers to aggregation of ad space supply from publishers, such as for provision en masse to advertisers. For web portals like Yahoo!®, advertisements may be displayed on web pages or in apps resulting from a user-defined search based at least in part upon one or more search terms. Advertising may be beneficial to users, advertisers or web portals if displayed advertisements are relevant to interests of one or more users. Thus, a variety of techniques have been developed to infer user interest, user intent or to subsequently target relevant advertising to users. One approach to presenting targeted advertisements includes employing demographic characteristics (e.g., age, income, gender, occupation, etc.) for predicting user behavior, such as by group. Advertisements may be presented to users in a targeted audience based at least in part upon predicted user behavior(s).

Another approach includes profile-type ad targeting. In this approach, user profiles specific to a user may be generated to model user behavior, for example, by tracking a user's path through a web site or network of sites, and compiling a profile based at least in part on pages or advertisements ultimately delivered. A correlation may be identified, such as for user purchases, for example. An identified correlation may be used to target potential purchasers by targeting content or advertisements to particular users. During presentation of advertisements, a presentation system may collect descriptive content about types of advertisements presented to users. A broad range of descriptive content may be gathered, including content specific to an advertising presentation system. Advertising analytics gathered may be transmitted to locations remote to an advertising presentation system for storage or for further evaluation. Where advertising analytics transmittal is not immediately available, gathered advertising analytics may be stored by an advertising presentation system until transmittal of those advertising analytics becomes available.

Servers 106, 108, 120 and 130 may be capable of sending or receiving signals, such as via a wired or wireless network, or may be capable of processing or storing signals, such as in memory as physical memory states. Devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally, a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

In some embodiments, users are able to access services provided by servers 106, 108, 120 and/or 130. This may include in a non-limiting example, authentication servers, search servers, email servers, social networking services servers, SMS servers, IM servers, MMS servers, exchange servers, photo-sharing services servers, and travel services servers, via the network 105 using their various devices 101-104. In some embodiments, applications, such as a search application (e.g., Yahoo!® Search), mail or messaging application (e.g., Yahoo!® Mail, Yahoo! ® Messenger), a photo sharing/user-generated content (UGC) application (e.g., Flickr®, Tumblr®, Instagram® and the like), a streaming video application (e.g., Netflix®, Hulu®, iTunes®, Amazon Prime®, HBO Go®, and the like), blog, photo or social networking application (e.g., Facebook®, Twitter® and the like), and the like, can be hosted by the application server 108 (or content server 106, search server 120 and the like).

Thus, the application server 108 can store various types of applications and application related information including application data and user profile information (e.g., identifying and behavioral information associated with a user). It should also be understood that content server 106 can also store various types of data related to the content and services provided by content server 106 in an associated database 107, as discussed in more detail below. Embodiments exist where the network 105 is also coupled with/connected to a Trusted Search Server (TSS) which can be utilized to render content in accordance with the embodiments discussed herein. Embodiments exist where the TSS functionality can be embodied within servers 106, 108, 120 and/or 130.

Moreover, although FIG. 1 illustrates servers 106, 108, 120 and 130 as single computing devices, respectively, the disclosure is not so limited. For example, one or more functions of servers 106, 108, 120 and/or 130 may be distributed across one or more distinct computing devices. Moreover, in one embodiment, servers 106, 108, 120 and/or 130 may be integrated into a single computing device, without departing from the scope of the present disclosure.

Figure 2:
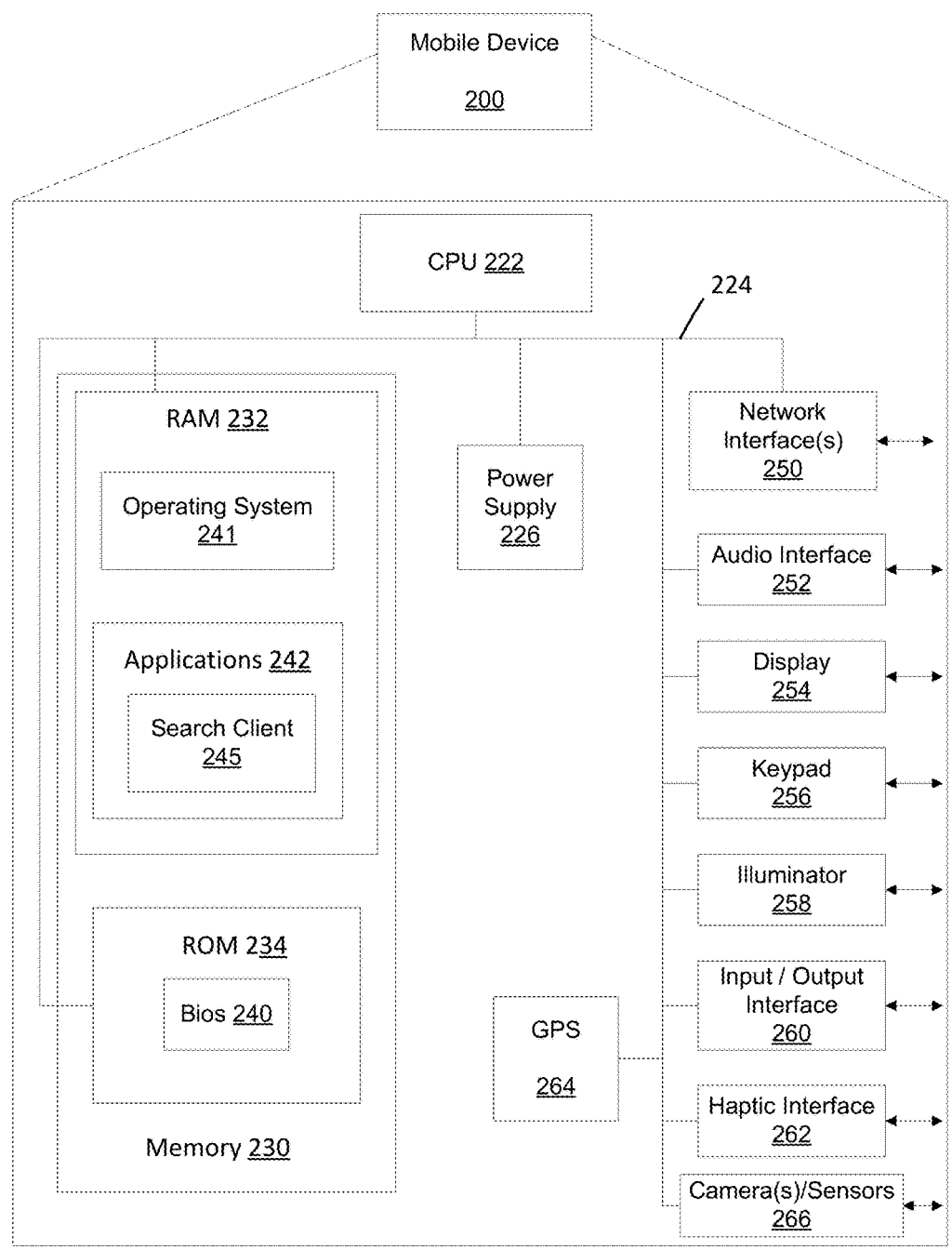
FIG. 2 depicts is a schematic diagram illustrating an example of client device in accordance with some embodiments of the present disclosure.

FIG. 2 is a schematic diagram illustrating a client device showing an example embodiment of a client device that may be used within the present disclosure. Client device 200 may include many more or less components than those shown in FIG. 2. However, the components shown are sufficient to disclose an illustrative embodiment for implementing the present disclosure. Client device 200 may represent, for example, client devices discussed above in relation to FIG. 1.

As shown in the figure, Client device 200 includes a processing unit (CPU) 222 in communication with a mass memory 230 via a bus 224. Client device 200 also includes a power supply 226, one or more network interfaces 250, an audio interface 252, a display 254, a keypad 256, an illuminator 258, an input/output interface 260, a haptic interface 262, an optional global positioning systems (GPS) receiver 264 and a camera(s) or other optical, thermal or electromagnetic sensors 266. Device 200 can include one camera/sensor 266, or a plurality of cameras/sensors 266, as understood by those of skill in the art. The positioning of the camera(s)/sensor(s) 266 on device 200 can change per device 200 model, per device 200 capabilities, and the like, or some combination thereof.

Power supply 226 provides power to Client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 250 includes circuitry for coupling Client device 200 to one or more networks, and is constructed for use with one or more communication protocols and technologies as discussed above. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Client device 200 also comprises input/output interface 260 for communicating with external devices, such as a headset, or other input or output devices not shown in FIG. 2. Input/output interface 260 can utilize one or more communication technologies, such as USB, infrared, Bluetooth™, or the like. Haptic interface 262 is arranged to provide tactile feedback to a user of the client device. For example, the haptic interface may be employed to vibrate client device 200 in a particular way when the Client device 200 receives a communication from another user.

Optional GPS transceiver 264 can determine the physical coordinates of Client device 200 on the surface of the Earth, which typically outputs a location as latitude and longitude values. GPS transceiver 264 can also employ other geopositioning mechanisms, including, but not limited to, triangulation, assisted GPS (AGPS), E-OTD, CI, SAI, ETA, BSS or the like, to further determine the physical location of Client device 200 on the surface of the Earth. It is understood that under different conditions, GPS transceiver 264 can determine a physical location within millimeters for Client device 200; and in other cases, the determined physical location may be less precise, such as within a meter or significantly greater distances. In one embodiment, however, Client device may through other components, provide other information that may be employed to determine a physical location of the device, including for example, a MAC address, Internet Protocol (IP) address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of Client device 200. The mass memory also stores an operating system 241 for controlling the operation of Client device 200. It will be appreciated that this component may include a general purpose operating system such as a version of UNIX, or LINUX™, or a specialized client communication operating system such as Windows Client™, or the Symbian® operating system. The operating system may include, or interface with a Java virtual machine module that enables control of hardware components and/or operating system operations via Java application programs.

Memory 230 further includes one or more data stores, which can be utilized by Client device 200 to store, among other things, applications 242 and/or other data. For example, data stores may be employed to store information that describes various capabilities of Client device 200. The information may then be provided to another device based on any of a variety of events, including being sent as part of a header during a communication, sent upon request, or the like. At least a portion of the capability information may also be stored on a disk drive or other storage medium (not shown) within Client device 200.

Applications 242 may include computer executable instructions which, when executed by Client device 200, transmit, receive, and/or otherwise process audio, video, images, and enable telecommunication with a server and/or another user of another client device. Other examples of application programs or "apps" in some embodiments include browsers, calendars, contact managers, task managers, transcoders, photo management, database programs, word processing programs, security applications, spreadsheet programs, games, search programs, and so forth. Applications 242 may further include search client 245 that is configured to send, to receive, and/or to otherwise process a search query and/or search result using any known or to be known communication protocols. Although a single search client 245 is illustrated it should be clear that multiple search clients may be employed. For example, one search client may be configured to enter a search query message, where another search client manages search results, and yet another search client is configured to manage serving digital content (e.g., advertisements) or other forms of digital data associated with, but not limited to, IMs, emails, and other types of known messages, or the like.

Having described the components of the general architecture employed within the disclosed systems and methods, the components' general operation with respect to the disclosed systems and methods will now be described below with reference to FIGS. 3-5.

Figure 3:
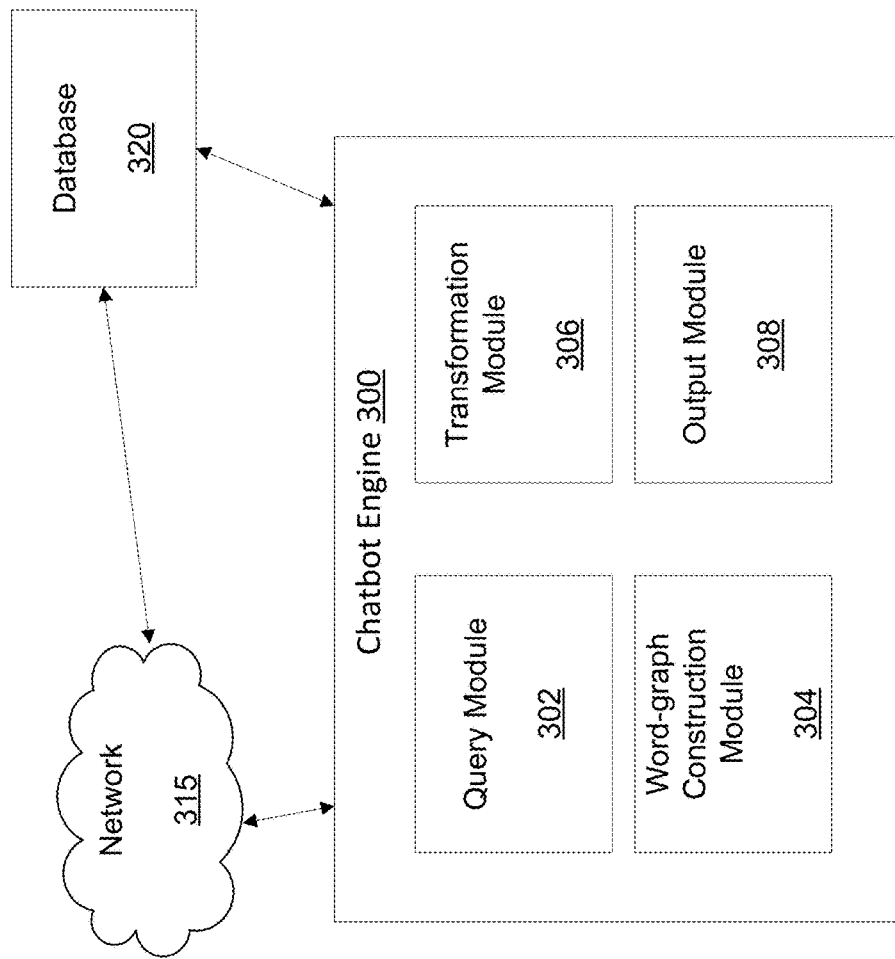
FIG. 3 is a schematic block diagram illustrating components of an exemplary system in accordance with embodiments of the present disclosure.

FIG. 3 is a block diagram illustrating the components for performing the systems and methods discussed herein. FIG. 3 includes a chatbot engine 300, network 315 and database 320. The chatbot engine 300 can be a special purpose machine or processor and could be hosted by a search server, application server, content server, social networking server, web server, messaging server, content provider, email service provider, ad server, user's computing device, and the like, or any combination thereof.

According to some embodiments, chatbot engine 300 can be embodied as a stand-alone application that executes on a user device. In some embodiments, the chatbot engine 300 can function as an application installed on the user's device, and in some embodiments, such application can be a web-based application accessed by the user device over a network. In some embodiments, the chatbot engine 300 can be installed as an augmenting script, program or application to another searching, messaging and/or media content hosting/serving application, service or platform, such as, for example, Yahoo! Search, Yahoo! Mail, Yahoo!Messenger, Flickr®, Tumblr®, Twitter®, Instagram®, SnapChat®, Facebook®, and the like.

The database 320 can be any type of database or memory, and can be associated with a content server on a network (e.g., content server 106, search server 120, ad server 130 or application server 108 from FIG. 1) or a user's device (e.g., device 101-104 or device 200 from FIGS. 1-2). Database 320 comprises a dataset of data and metadata associated with local and/or network information related to users, services, applications, content (e.g., images) and the like. Such information can be stored and indexed in the database 320 independently and/or as a linked or associated dataset. As discussed above, it should be understood that the data (and metadata) in the database 320 can be any type of information and type, whether known or to be known, without departing from the scope of the present disclosure.

According to some embodiments, database 320 can store data for users, i.e., user data. According to some embodiments, the stored user data can include, but is not limited to, information associated with a user's profile, user interests, user behavioral information, user attributes, user preferences or settings, user demographic information, user location information (i.e., past and present location(s) of the user, and future locations of the user (derived from a calendar or schedule of the user—e.g., planned activities), user biographic information, and the like, or some combination thereof. In some embodiments, the user data can also include, for purposes rendering and/or displaying images, user device information, including, but not limited to, device identifying information, device capability information, voice/data carrier information, Internet Protocol (IP) address, applications installed or capable of being installed or executed on such device, and/or any, or some combination thereof. It should be understood that the data (and metadata) in the database 320 can be any type of information related to a user, content, a device, an application, a service provider, a content provider, whether known or to be known, without departing from the scope of the present disclosure.

According to some embodiments, database 320 can comprise information associated with content providers, such as, but not limited to, content generating and hosting sites or providers that enable users to search for content, message (e.g., send or receive messages), upload, download, share, edit, comment or otherwise avail users to media content (e.g., Yahoo!Search, Yahoo!@ Mail, Flickr®, Tumblr®, Twitter®, Instagram®, SnapChat®, Facebook®, and the like). Such sites may also enable users to search for and purchase products or services based on information provided by those sites, such as, for example, Amazon®, EBay® and the like. In some embodiments, database 320 can comprise data and metadata associated with such content information from one and/or an assortment of media hosting sites.

In some embodiments, database 320 can comprise a lexicon of one or more words, by way of non-limiting example, a vocabulary, dictionary or catalogue of words/phrases (e.g., known or learned word combinations). As discussed below, the lexicon can be compiled based on social networking, search and mail activity of users on a network. In some embodiments, the lexicon information housed within the database 320 can be arranged in accordance with various known or to be known models in order to preserve an efficient and accurate retrieval of terms within the database.

According to some embodiments, the lexicon in database 320 comprises terms (i.e., words, phrases or paragraphs) arranged according to how they were generated. For example, terms associated with search queries can be organized according to when they were entered by a user and/or which other search terms were associated therewith. Terms associated with mail messages, for example, can be organized in accordance with other terms in the same or similar messages (e.g., group text within a single message, group text associated with a message thread). Terms associated with social networking activity can be organized in accordance with their order, their topic and/or by which users and/or the domain they are associated with, for example. In some embodiments, the words are arranged according to known or to be known language models. The words in the lexicon can be assigned a unique identifier, such as, but not limited to, a number or value. It should be understood that generally no two words (or phrases) in a lexicon are associated with the same unique identifier. Thus, a unique identifier should be unique to one word/phrase in the lexicon.

According to some embodiments, n-grams may be encoded using such word identifiers. As understood by those of skill in the art, an n-gram involves computational linguistics for a contiguous sequence of n-items from a given sequence of text. Thus, in the lexicon within database 320, the terms that are related to one another (e.g., terms in a search query or terms in a message) can be arranged according to a language model utilized for identifying the next item in such a sequence. It should be understood that any known or to be known arrangement or model (e.g., Markov model) and/or algorithm can be used for arranging one or more words, and identifying such one or more words in the database 320.

In some embodiments, database 320 can be specific to a user, a network service or platform, or a global lexicon (such as a generic or learned/trained lexicon). Thus, in some embodiments, the lexicon of terms in database 320 may be ranked or ordered according to the number of times a user or users has used a term during a predetermined period. In some embodiments, the lexicon in database 320 can be based on a user's or users' behavior (e.g., past activity—for example, words or phrases used in social network messages at or above a threshold (frequency over a predetermined time) which takes precedence over global lexical norms and conventions). Therefore, in some embodiments, a determined frequency for which a user uses a word or phrase online may be utilized to organize how a lexicon stores or organizes words/phrases.

In some embodiments, the information stored in database 320 can be represented as an n-dimensional vector (or feature vector) for each stored term, where the information associated with the words (or text or keywords) within each search and/or message corresponds to a node(s) on the vector. Additionally, the information in database 320 can comprise, but is not limited to, social metrics associated with the information (e.g., popularity of the content or product—a number of views, shares, favorites, reviews or purchases), a title or comment(s) associated with the information, tags, descriptions, quality of the content, recency of the content's upload and/or share(s), and the like. Such factors can be derived from information provided by the user, a service provider (e.g., Yahoo!®), by the content/service providers providing content information (e.g., Tumblr®, Flickr®, or third party vendor sites), or by other third party services (e.g., Twitter®, Facebook®, Instagram®, and the like, or third party sites that enable users to purchase products from other vendors, such as Amazon®), or some combination thereof. In some embodiments, such additional factors can also be translated as nodes on the n-dimensional vector for a respective search query, search result and/or message.

As such, database 320 can store and index content information in database 320 as linked set of data and metadata, where the data and metadata relationship can be stored as the n-dimensional vector discussed above. Such storage can be realized through any known or to be known vector or array storage, including but not limited to, a hash tree, queue, stack, VList, or any other type of known or to be known dynamic memory allocation technique or technology. While the discussion of some embodiments involves vector analysis of content information, as discussed above, the information can be analyzed, stored and indexed according to any known or to be known computational analysis technique or algorithm, such as, but not limited to, Word2Vec analysis, cluster analysis, data mining, Bayesian network analysis, Hidden Markov models, artificial neural network analysis, logical model and/or tree analysis, and the like.

In some embodiments, database 320 can be a single database housing information associated with one or more devices, users, services and/or content providers, and in some embodiments, database 320 can be configured as a linked set of data stores that provides such information, as each datastore in the set is associated with and/or unique to a specific user, device, service and/or content provider.

As discussed above, with reference to FIG. 1, the network 315 can be any type of network such as, but not limited to, a wireless network, a local area network (LAN), wide area network (WAN), the Internet, or a combination thereof. The network 315 facilitates connectivity of the chatbot engine 300, and the database of stored resources 320. Indeed, as illustrated in FIG. 3, the chatbot engine 300 and database 320 can be directly connected by any known or to be known method of connecting and/or enabling communication between such devices and resources.

The principal processor, server, or combination of devices that comprises hardware programmed in accordance with the special purpose functions herein is referred to for convenience as chatbot engine 300, and includes a query module 302, word-graph construction module 304, transformation module 306 and output module 308. It should be understood that the engine(s) and modules discussed herein are non-exhaustive, as additional or fewer engines and/or modules (or sub-modules) may be applicable to the embodiments of the systems and methods discussed. The operations, configurations and functionalities of each module, and their role within embodiments of the present disclosure will be discussed below.

Figure 4A:
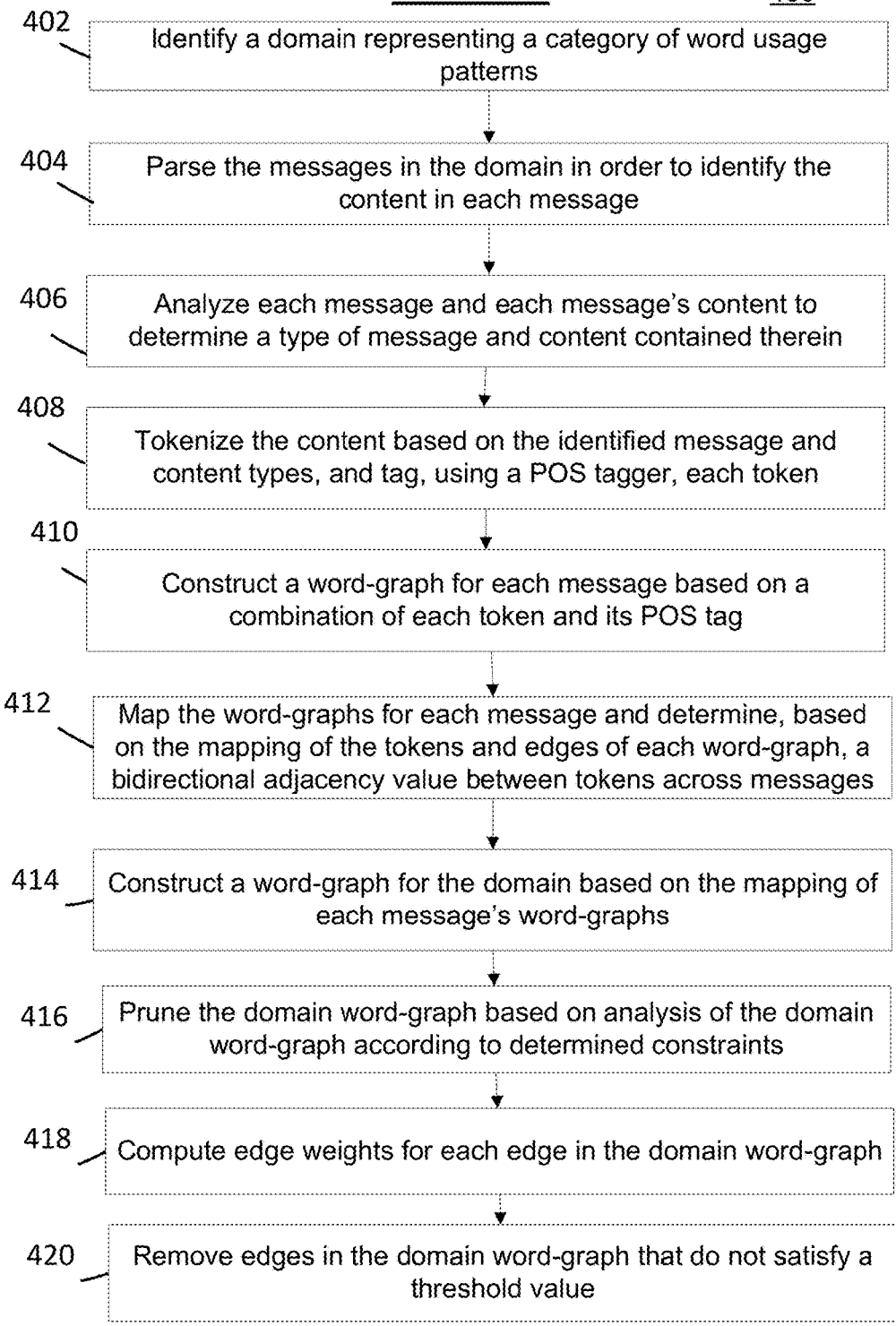

Turning to FIGS. 4A-4B, Process 400 of FIG. 4A and Process 450 of FIG. 4B detail steps performed in accordance with some embodiments of the present disclosure for generating the most appropriate domain-specific response, as discussed herein. Process 400 of FIG. 4A details the steps in generating domain-specific graphs corresponding to stylized lexicons that are utilized to generate the domain-specific response, and Process 450 of FIG. 4B details the steps performed by a computer(s) generating such response.

As discussed herein with reference to Processes 400 and 450, a regular chatbot response is determined, which is a response without any stylized (or stylistic) elements added. As discussed above, for purposes of explanation with regard to Process 400 and 450, the transformation of the regular response will be detailed with respect to two domains—politics and entertainment. As discussed in detail below, the transformation of the regular response to the domain-specific, stylized response will retain the factual content of the regular response, but add a distinctive style such that a user can easily identify and attribute the response to a specific domain.

By way of a non-limiting example, as illustrated in FIG. 5, a regular chatbot response for an inquiry 502 related to the weather, for example, "How is the weather", would typically involve the following text, for example: "It is very hot today"—item 504. The response 504 would be transformed into a domain-specific response based on the steps outlined in the below disclosure related to Processes 400 and 450.

For example, for an entertainment-type domain (e.g., fashionista domain, for example), the regular response 504 of "It is very hot today" would be transformed into a response 506: "Brace yourselves lovely people, it is kinda hot today! xoxo." The factual nature that it is going to be hot today remains in the transformed response 506; however, it has been stylized from the perspective of how fashionistas would typically speak. For example, the words "Brace yourselves lovely people" "kinda" and "xoxo" have been added to the text of regular response 504, as has the punctuation "," and "!"; and the "." at the end of the regular response 504 has been changed. Also, the word "very" has been removed in view of the addition of "kinda".

In another non-limiting example, for a political-type domain, the regular response 504 of "It is very hot today" would be transformed into a response 508: "Ladies and gentlemen, it appears to be very hot today. Stay safe." The factual nature that it is going to be hot today remains in the transformed response 508; however, it has been stylized from the perspective of how politicians would typically speak. For example, the words "Ladies and gentlemen", "appears to be", "very" and "stay safe" have been added to the text of regular response 504, as has the punctuation ",","and".". Also, the word "is" from the regular response 504 has been removed in view of the addition of "appears to be".

Thus, as illustrated in FIG. 5, these example embodiments show how a regular response 504 is transformed according to two different domains: entertainment domain (as related to the transformed response 506) and political domain (as related to the transformed response 508). The responses 506 and 508 have subtle differences based on stylistic elements of words used, formality in tone, and the like, derived from the learned styles of each domain, as discussed in detail below.

For purposes of this disclosure, in order to learn, understand or otherwise leverage the specific styles how vocabularies and word patterns of particular domains, the chatbot engine 300 relies on analysis and identified and/or extracted data from Twitter® messages. While the discussion herein will focus on messages from Twitter®, it should not be construed as limiting, as any type of network accessible platform/resource from which language processing can occur can be utilized as a basis for formulating the word-graphs, for example, but not limited to, other social networking sites (e.g., Facebook®), email (e.g., Yahoo! Mail®), blogs, articles, instant messaging platforms (e.g., Yahoo! Messenger®, WhatsApp®, and the like), web portals, and the like, or some combination thereof.

It is understood by those of ordinary skill in the art that Twitter® users constitute different types of personas, such as, for example, politicians, singers, actors, sports persons, and the like. Therefore, as discussed in more detail below, the chatbot engine utilizes tweets as a data source to model domain-specific styles. Identifying differences in vocabularies and word-usage patterns across domains is critical in modeling domain peculiarities and hence, differentiating between domains. For examples, tweets from fashionistas contain informal language ("xoxo," and "ahhhhh," for example) and heavy usage of emoticons. In contrast, tweets from politicians are more formal. By introducing the peculiarities of a domain-specific style in a response, and keeping its existing factual content intact, the style of a specific domain can be mimicked when outputting a chatbot response to an inquiring user. This intuition forms the core of disclosed methodology, as discussed herein.

Process 400 details the computerized techniques for constructing domain-specific word-graphs using tweets posted from Twitter® accounts (and/or any other type of network accessible platform/resource that enables learning/training of a system to understand language styles) that belong to users from specific domains, and using the graph to generate word-patterns.

According to some embodiments, as discussed below, the chatbot engine 300 constructs a domain-specific word-graph using tweets from Twitter handles (accounts) belonging to a domain. In some embodiments, the word-graph for a domain is based upon a multi-sentence compression approach where the nodes represent words (along with part-of-speech (POS) tags) and the edges connect two adjacent words. In the instant disclosure, this approach is extended and improved upon by constructing a reliable graph by ignoring edges and nodes which do not meet specific constraints. In some embodiments, the infrequent edges in the set of tweets are removed, as discussed in more detail below. Traversing the word-graph from one node to another results in several paths which form certain word-patterns. The chatbot engine 300 filters out patterns containing nouns to prevent deviation from the actual information, and restricts paths between pairs where the second word is an auxiliary verb to avoid introducing irrelevant patterns. Multiple scores are determined and assigned to each pattern (e.g., importance score, contextual similarity score and linguistic quality score), as discussed below.

Then, the resultant word-graph for a domain is then utilized as part of an Integer-Linear Programming (ILP) technique executed by the chatbot engine 300 in order to select the most appropriate patterns based on the above mentioned scores and rewrite the regular response. This rewriting, or transformation of the regular response is disclosed in relation to Process 450 which details the computerized steps for responding to an inquiry with a transformed response by leveraging the constructed word graphs from Process 400.

Turing first to FIG. 4A, Steps 402-420 of Process 400 are performed by the word-graph construction module 304 of the chatbot engine 300. Process 400 begins with Step 402 where a domain representing a category of word usage patterns is identified. As discussed above, such word usage patterns are related to ways or manners in which individuals speak (e.g., their personalities)—for example, politicians, sports reports, commentators, fashionistas, people in the entertainment industry and the like. As a result of Step 402, messages, and for purposes of this disclosure (as discussed above), tweets from this domain are retrieved. For example, at least a sample of 100 k tweets from the domain (e.g., 100 k tweets from politicians during the 2016 Presidential Campaign).

In Step 404, each retrieved message is parsed in order to identify the content of each message. According to embodiments, for example, each retrieved tweet is parsed, and the parsed data is analyzed in order to identify the words (or identifiable character strings) within each tweet.

In Step 406, each message and each message's content is analyzed in order to determine a type of each message and the content contained therein. The message type is determined because duplicate messages are discarded from the retrieved set of messages. For example, "retweets" are discarded because they are duplicates of an original tweet. The content type of each message is determined because messages can contain any type of content, including, but not limited to, words, numbers, hashtags, or other symbols and identifiers, uniform resource locators (URLs), images, videos, and the like, and for purposes for tokenizing the content, it may be required to identify the type of content, as discussed below.

In Step 408, based on the identified message types and content types contained therein, the content of each message is tokenized and tagged. As understood by those of skill in the art, tokenization is a natural language processing (NLP) process of breaking a stream of text up into identified words, phrases, symbols, or other meaningful elements and identifying them as "tokens." In some embodiments, such tokenization can be performed by any known or to be known algorithm, technology or mechanism for tokenizing content, including, but not limited to, NLTK Treebank tokenizer technology. Based on the content type determination, all URLs, hashtags, numbers and other symbols or identifiers (e.g., Twitter® handles) are modified into standard tokens. The words, or tokens as discussed herein, are then tagged with part-of-speech (POS) tags. For example, each token can be assigned a tag using a Twitter-specific POS tagger (or any other type of known or to be known POS tagger, or domain-specific tagger).

In Step 410, a word-graph for each message is constructed based on the combination of each token and its POS tag. According to embodiments of the instant disclosure, the word-graph for each message comprises nodes and edges between the nodes. The node, which is a combination of a word and its POS tag, represents a token and are iteratively added or mapped to the graph. An edge is created between two nodes if the corresponding tokens are adjacent in the original message (or tweet). In some embodiments, the adjacency direction between the nodes is maintained by the graph having directed edges (showing the order of words in the message). In some embodiments, adjacency can be bidirectional such that the edges are bidirectional between adjacent words.

In Step 412, the word-graphs for each message are mapped according to their respective tokens and edges, and based on such mapping, a bidirectional adjacency value is determined between tokens across messages. According to embodiments of the instant disclosure, such mapping is performed according to a predefined or predetermined set of rules that dictate how tokens are added to a graph. For example, in some embodiments, if there are no nodes with the same corresponding word and POS tag as w, a new node is created with token w. If there is only one node in the graph with the same corresponding word and POS tag as w, then w is mapped to that node.

According to some embodiments, when there are multiple nodes with the same word and POS tag as w, w is assigned to the node which has the highest contextual similarity with w. Contextual similarity, as discussed in more detail below, is a value representing a number of common words within a window of one word on either side of the nodes and the current token (w) in a tweet. If multiple nodes have the same contextual similarity with w, then w is assigned randomly to one of those nodes. If contextual similarity is zero for all the nodes, a new node with w is created as a token. Such determinations of context of words and messages, and their contextual similarity enable the chatbot engine 300 to avoid spurious mappings of words to existing nodes.

In some embodiments, adjacency between two tokens across tweets can be bidirectional; therefore, the chatbot engine 300 can execute the following strategy to maintain the acyclic nature of the graph. For example, assuming a tweet with the following consecutive pair of written words (referred to as a bigram): $w_1\_w_2$, where $w_1$ and $w_2$ are the two tokens in the bigram. For this adjacency, there will be a directed edge from node $n_1$ to node $n_2$, whose corresponding tokens are $w_1$ and $w_2$, respectively. In embodiments where there is a tweet having a reverse bigram, i.e., $w_2\_w_1$, then to avoid forming a cycle between nodes $n_1$ and $n_2$, $w_2$ is mapped to $n_2$ using the above mentioned criteria, but $w_1$ is not mapped to $n_1$ even if the mapping criteria are met. Either a new node for $w_1$ is created or $w_1$ is assigned to another node (other than $n_1$) depending upon whether the mapping criteria are met or not.

In Step 414, a word-graph for the domain, or specific to the domain, is constructed based on the mapping of each message's word-graphs. By way of a non-limiting example, using the following example tweets in the politics domain:

1. "We will win in 2016 because we are going to create an unprecedented grassroots movement."
2. "The only way we can win is if enough people come together to join our movement. So, are you in?"

As can be seen above, the tweets have common words such as "win" and "movement". Merging the sentences along the words would result in several new possible patterns between pairs of words. For example: a pattern— "unprecedented grassroots movement. So, are you in?" between "unprecedented" and "in", that did not exist in any of the two tweets but is now generated as a result of fusion between both the tweets. According to some embodiments, as discussed herein, two dummy nodes (-start- and -end-) can be introduced to map the beginning and end of all the tweets.

In Step 416, the constructed word-graph from Step 414 is pruned based on analysis of the nodes and edges in the domain word-graph according to determined (or predetermined) constraints. One of ordinary skill in the art would understand that constructing a domain word-graph using adjacency relations between the words in all the messages from a domain results in a large number of edges. Not all the edges are very frequent (satisfying an occurrence threshold), and may contain grammatically incorrect sequences due to the general informal style of tweets. As such, a significant number of such edges are determined to be irrelevant and should be removed. Therefore, in order to favor relevant and grammatically correct word patterns, the chatbot engine 300 executes a pruning function at both node and edge levels. According to some embodiments, the nodes that have less than a predetermined number of edges (e.g., a constraint indicating a minimum number of edges: 5 edges, including both outgoing and incoming edges) are removed from the domain word-graph.

In Step 418, an edge weight is computed for each of the remaining edges in the domain word-graph. In Step 420, a further pruning step is performed based on the determined edge weights, such that the edges with edge weights lower than a threshold value (e.g., the $t^{th}$ percentile value) are removed from the domain word-graph.

According to some embodiments, the edge weight W can be computed as follows:

$$W(e_{ij}) = \frac{freq(w_i w_j)}{freq(w_i) * freq(w_j)}, \qquad \text{(Eq. 1)}$$

where $W(e_{ij})$ denotes the weight of edge $e_{ij}$ between nodes i and j with corresponding tokens $w_1$ and $w_2$, respectively; and freq denotes the frequency. From Eq. 1, the numerator computes the frequency of co-occurrence of tokens $w_1$ and $w_2$, and the denominator computes the unigram frequencies of $w_1$ and $w_2$.

As such, as a result of Steps 402-420 of Process 400, a domain-specific word-graph is compiled that is ready to use on a regular response in order to insert stylized words that enables the transformed response to mimic a personality associated with the domain, as discussed below in relation to Process 450 of FIG. 4B.

Turning now to Process 450 of FIG. 4B, Steps 452-454 are performed by the query module 302 of the chatbot engine 200; Steps 454-472 are performed by the transformation module 306; and Step 474 is performed by the output module 308. Process 450 details the steps for transforming a regular response from a chatbot by introducing and inserting relevant word patterns between existing words of the response without modifying its factual content. Such transformation is modeled as an Integer-Linear Programming (ILP) problem.

Process 450 begins with Step 452 where an input is received from a user in relation to a chatbot that includes a query. For example, a user can be viewing a webpage and in response to a chatbot dialog box being displayed on the page, the user can enter a query, which can include a string of characters. As understood by those of skill in the art, the input can be any type of input, including, but not limited to, a character string of text, numbers or symbols, a URL(s), image content, video content, voice or audio content, longitude and latitude coordinates, global positioning system (GPS) data, and the like, or some combination thereof. Thus, Step 402 involves the entering of the query and the input that triggers a search to be performed for a chatbot regular response to the query.

In Step 454, in response to the query, the chatbot engine 300 searches an associated database (or another resource location on the internet) for a response to the query. Searching and identification of the proper chatbot response can be performed by any known or to be known chatbot, or chatbot executed technology, such as, but not limited to, NLP, n-gram analysis, vector translation and analysis, and the like, or some combination thereof. Therefore, as a result to Step 454, the chatbot engine 300 determines, retrieves or otherwise identifies a regular response to the query, which includes a string or sequence of words.

In Step 456, the chatbot engine 300 tokenizes the regular response in order to identify the individual words included in the regular response. According to some embodiments, such tokenization is performed in a similar manner as discussed above in relation to Step 408 of Process 400.

In Step 458, based on the identified words identified from the tokenization of the regular response occurring in Step 456, a search of a repository is performed in order to determine, retrieve or otherwise identify a set of synonyms for each word in the regular response. According to some embodiments, the number of synonyms for each word can be capped at a preset limit so as not to have an unequal number of synonyms for particular words.

In some embodiments, whether a synonym for a word is identified is based on the type of word. That is, the chatbot engine 300 can implement basic syntactic rules to improve grammatical correctness of the generated word patterns in the final output (of Process 450). For example, if a second or subsequent word in a word pair (bigram) is an auxiliary verb (such as, for example, "is" or "are"), then a synonym for such word may not be identified, as no new word would be introduced between the pair. Without such constraint, there is a high probability that several irrelevant words could be introduced between the stopwords that result in an incoherent output.

In Step 460, a set of bigrams is created based on the combinations of words in the regular response and in the determined set of synonyms. In some embodiments, the created bigrams, embodied as an extended set of bigrams from the bigrams of the regular response, are constructed such that the synonyms of a word are connected. In some embodiments, the extended bigrams are constructed such that all possible combinations of words are realizable from the constructed bigram.

In Step 462, a domain related to the regular response (or chatbot) is identified. For example, if the query was entered in a domain related to political news, a political domain is identified. In another example, the context of the regular response (and/or the query) can be determined (e.g., by parsing the text of the response/query and determining its topic) and then identifying a domain related to such topic. As a result of Step 462, a domain-specific word-graph is identified that is related to the identified domain. Such domain-specific word-graph is the graph constructed in Process 400, discussed above.

In Step 464, for each bigram constructed in Step 460, word patterns are determined, obtained or otherwise identified between the words of the bigram from the domain word-graph associated with the identified domain. According to some embodiments, the identification of the word patterns can be performed by traversing the graph from one node to another in order to identify a path between the words in the bigram, and identifying the words between the bigram words on such path. For example, if a bigram includes the words "hot, today", then the first step is to identify the word "hot" in the domain word-graph, then traverse the graph until the word "today" is located; then, identify the word pattern (or sequence of words) that appear along that path. In some embodiments, such word pattern identification can be performed according to the mapping steps discussed above in relation to Step 412 discussed above.

In some embodiments, the maximum number of words in the identified word pattern can be restricted to a value K in order to prevent a major deviation from the original meaning of the regular response. In such embodiments, should a word pattern (or sequence or path) have more than K words, then it can be discarded.

In Step 466, the chatbot engine 300 then computes word pattern scores for each obtained word pattern, and identifies a subset of word patterns based on their scores.

By way of a non-limiting example, a regular response contains the following ordered set of words $w_1, w_2, w_3 \ldots w_m$. Two consecutive words in the above set of words are: $w_i$ and $w_j$, where j=i+1 (which indicates that the max pattern to be inserted within each word is 1). Each pattern between the pair of words $w_i$ and $w_j$ is denoted by $p^q_{ij}$. As discussed above, patterns are obtained using a domain-specific word graph structure constructed using tweets that are associated with the domain. Each pattern has several scores associated with it including: importance, contextual similarity and linguistic quality:

Importance ($I(p^q_{ij})$): Informativeness or importance of the pattern computed using average co-occurrence scores between every pair of words from the domain-specific word-graph. The value is obtained using Eq. 1 discussed above.

Contextual Similarity ($Sim(p^q_{ij})$): Contextual similarity is computed as the cosine similarity between the paragraph vector of the regular response and the paragraph vector of the pattern. Generated patterns should be contextually relevant to the original regular response otherwise the final response may be incoherent and vague. For example, when transforming the response "bond market", it should include patterns that fit into the context of the "financial bond sector" and not a "bond movie". To obtain contextually relevant patterns, the chatbot engine 300 computes similarities between the original regular response and the generated patterns from the domain word-graph. In some embodiments, the regular response and the patterns can be represented as vector representations using, for example, Paragraph2Vec, where the cosine similarities between the regular response and each pattern are computed. The patterns with higher cosine similarities are ranked higher and the transformation of the regular response is only based on the top n patterns (e.g., top 5 patterns).

Linguistic Quality ($LQ(p^q_{ij})$): Indicator of grammaticality that assigns a score of linguistic confidence to a sequence of words using two language models trained, for example, on news and Twitter corpora. Such language modelling scores more probable sequences higher than the sequences that have lesser chances of occurring in the dataset.

According to some embodiments, the chatbot engine 300 may restrict deviation in sentiment in the modified response by limiting only those patterns whose sentiment levels were low. In other words, marked differences in opinions (or facts) between the original response and rewritten response are to be avoided. In some embodiments, patterns that had linguistic quality values between −2 to +2 (negative to positive) are used in order to ensure the same factual nature of the response is maintained upon transformation.

In Step 468, a dependency parser confidence score is determined based at least in part on the computed pattern scores (from Step 466), which accounts for overall grammaticality of the word patterns. In some embodiments, the dependency parser confidence score is computed using the Stanford Dependency Parser. The dependency parser confidence score is computed using the following equation:

$$F = D(k) * y_k + \sum_{i,j \in k, j=i+1} I(p^q_{ij}) * Sim(p^q_{ij}) * LQ(p^q_{ij})) * p^q_{ij}, \quad \text{(Eq. 2)}$$

where $D(k)$ is the dependency parser confidence score for sentence $y_k$. The number of sentences depends on the number of words in the regular response and also the number of patterns between each pair of words. Hence, if there are a, b, c and d number of patterns between all the word pairs respectively, a maximum of a*b*c*d sentences can be constructed. Due to this exponential nature, the number of patterns between pairs of words is restricted using an approach only keeping the top N patterns as retained. In some embodiments, for example, only the top two patterns are used.

In Step 470, the word pattern(s) with the highest dependency parser confidence score is selected, and such selection is according to a determined constraint that ensures that the selected pattern is the most relevant and topical sequence of words in relation to the regular response. In some embodiments, the following constraint is utilized:

$$\forall p_{ij}^q \text{ between } w_i \text{ and } w_j, \Sigma p_{ij}^q = 1, \quad \text{(Eq. 3)}.$$

For example, the sentences ($y_k$) are a result of combination of word patterns. Only one of the sentences can be selected out of all the possible sentences. Therefore, only a single combination of patterns between the first and the last word is selected corresponding to the selected sentence and all other combinations are discarded. To model this constraint, each $y_k$ is represented as a combination of patterns $\Pi i, j \in s \ldots e, q \in 1 \ldots max_q p_{ij}^q$, selecting only one pattern at a time between consecutive words. Here, s and e refer to two indices corresponding to "dummy" start and end words respectively. In some embodiments, the introduction of dummy words allows for introducing patterns at the beginning and end of the response. For example, if there are two words in a sentence, $w_1$ and $w_2$, the addition of the start and end dummy words creates a sequence $w_s, w_1, w_2$ and $w_e$. The patterns between the first two words would be represented as $p^1_{s1}, p^2_{s1}$, etc. Therefore, for example, one of the possible combinations of patterns between words would be $p^1_{s1}, p^1_{12}, p^1_{23}, p^1_{3e}$, where the first patterns between adjacent words are combined, which represents $y_1$, the first modified sentence. Each sentence is represented as the product of the patterns that constructed it:

$$\forall k, \forall q \in [1 \ldots \text{num\_patterns}] y_k = \prod_{i,j \in k, j=i+1} p_{ij}^q, \quad \text{(Eq. 4)}.$$

The num_patterns in Eq. 4 refers to the total number of patterns used to construct a sentence, which in the example above is equal to 4. According to some embodiments, since each sentence is represented as a product of several patterns, the chatbot engine 300 is creating non-linear equation. However, since ILP constraints need to be linear, the non-linearity is converted to linearity using simple transformations. As the variables are all binary, each $y_k$ is transformed using the pattern variables and linear constraints.

For example, having $y_1 = p^1_{s1}, p^1_{12}, p^1_{23}, p^1_{3e}$, the non-linear constraint can be rewritten as follows:

$$y_1 <= p^1_{s1} \quad \text{(Eq. 5)}.$$

-continued $$y_1 <= p_{12}^1$$

$$y_1 <= p_{23}^1$$

$$y_1 <= p_{3e}^1$$

$$y_1 >= p_{s1}^1 + p_{12}^1 + p_{23}^1 + p_{3e}^1 - (\text{num\_patterns} - 1),$$

Eq. 5 constrains the sentence variable such that it is equal to 1 if and only if all the associated patterns are equal to 1; otherwise it is equal to 0. Thus, as in Step 470, in some embodiments, only m the sentences/patterns can be selected (per bigram), and therefore, it is added as a constraint to the ILP, which is represented by the following equation:

$$\sum_k y_k = 1, \qquad\qquad\qquad (\text{Eq. 6}).$$

Solving the ILP along with the above mentioned constraints generates the optimal patterns used to modify the regular response. However, according to some embodiments, with the input sentence from the regular response, the complexity of the system continues to grow exponentially as the products of patterns can result in multiple sentences. Therefore, in some embodiments, a novel approach is applied by the chatbot engine 300 where only a predetermined number of patterns are selected between each set of words. This threshold value is a product of the three scores assigned to the patterns to obtain a ranked list, and only the top m patterns for the ILP formulation are chosen—where, for example, m is set to 2. In some embodiments, the maximum length of the pattern is set to a threshold value L (where L, for example, can be set to 2).

Therefore, in Step 472, the patterns selected by ILP are used to fill the gaps between adjacent words (or bigrams) and a revised response is generated. That is, a top ranked pattern is selected, as discussed above, and in Step 472, the selected pattern is inserted into the regular response, thereby modifying the response. This modified/transformed regular response is then output to the user in response to the query received in Step 452. Step 474. This response is output to the user for display within a user interface (UI) associated with the chatbot.

By way of another non-limiting example, based on the above discussions of Process 450 leveraging the domain word-graph constructed by Process 400, a regular response of "He is a loser" will be transformed using the domain word-graph built using tweets (e.g., from the Twitter® Firehose) from the entertainment domain (for example, from tweets sent by users from the entertainment industry). The following are the pairs of words between which patterns would be introduced: (i) -start-, he (ii) is, a (iii) a, loser (iv) loser, -end-. As discussed above, the -start- and -end- tokens are dummy tokens used to mark the start and end of the input. As a result, patterns can, in some embodiments, also be introduced before the first word and after the last word in the response. Given a particular domain word graph, example patterns between each pair of words are as follows: "is literally", "a total loser, loser !!! xoxoxo". Combining all the suggested patterns, results in the following sequence: "He is literally a total loser !!! xoxoxo." Here, the input sentence is significantly transformed to reflect the casual writing style used in tweets from users that belong to the entertainment domain.

Figure 6:
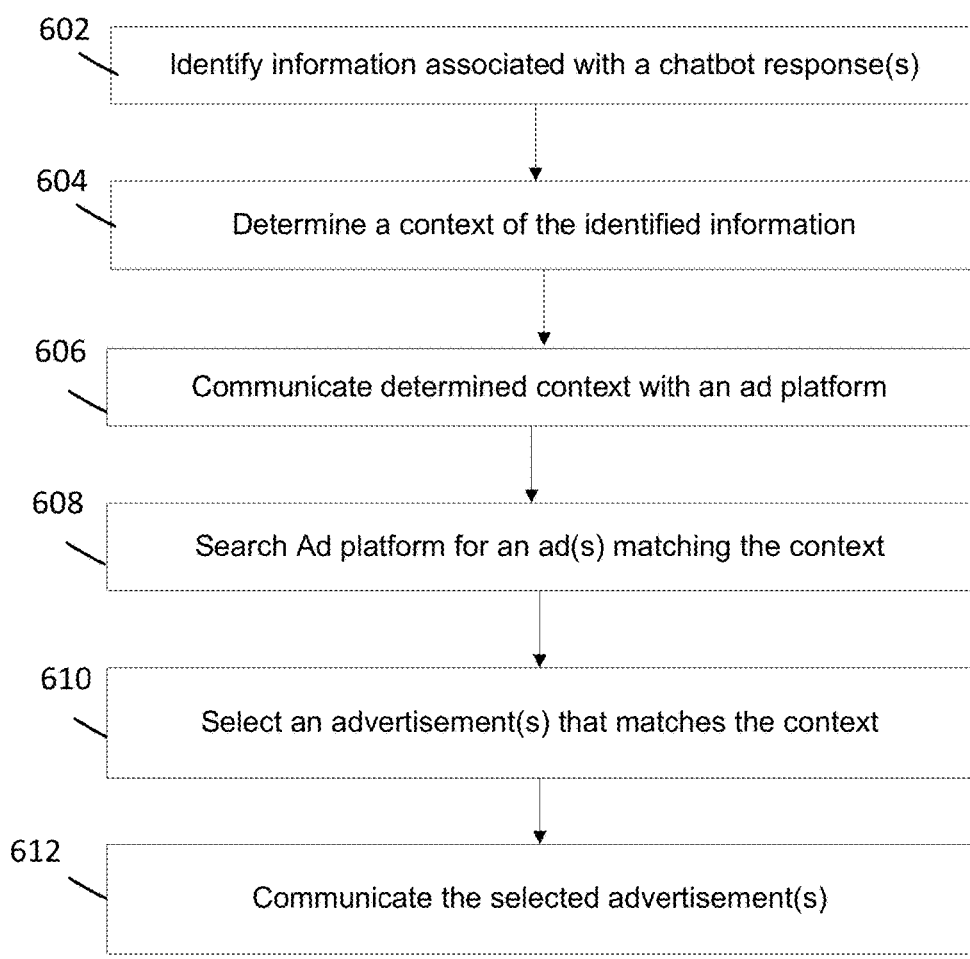
FIG. 6 is a flowchart illustrating steps performed in accordance with some embodiments of the present disclosure.

FIG. 6 is a work flow example 600 for serving relevant digital media content associated with or comprising advertisements (e.g., digital advertisement content) based on the information associated with a generated chatbot response, as discussed above in relation to FIGS. 3-5. Such information, referred to as "chatbot response information" for reference purposes only, can include, but is not limited to, information associated with the query or question asked by a user, information related to the requesting user, the domain associated with the response, the new words added to the response, the style added to the original response, and the like, and/or some combination thereof.

As discussed above, reference to an "advertisement" should be understood to include, but not be limited to, digital media content that provides information provided by another user, service, third party, entity, and the like. Such digital ad content can include any type of known or to be known media renderable by a computing device, including, but not limited to, video, text, audio, images, and/or any other type of known or to be known multi-media. In some embodiments, the digital ad content can be formatted as hyperlinked multi-media content that provides deep-linking features and/or capabilities. Therefore, while the content is referred as an advertisement, it is still a digital content item that is renderable by a computing device, and such digital content item comprises digital content relaying proprietary or promotional content provided by a network associated third party.

In Step 602, chatbot response information is identified. As discussed above, the chatbot response information can be based any of the information from processes outlined above with respect to FIGS. 3-5. For purposes of this disclosure, Process 600 will refer to single chatbot response as the basis for serving a digital advertisement(s); however, it should not be construed as limiting, as any number of responses, queries and the like, as well as programs used during the chatbot response generation/transformation can form such basis, without departing from the scope of the instant disclosure.

In Step 604, a context is determined based on the identified chatbot response information. This context forms a basis for serving advertisements related to the chatbot response information. In some embodiments, the context can be based on a determined category which the chatbot response information of Step 602 represents. For example, the chatbot response can include content associated with a category corresponding to "fashion"; therefore, the context identified in Step 604 can be related to "fashion" or other "clothing trends" and can be leveraged in order to identify digital ad content of interest (for example, a digital ad providing a promotion for a discount at a local (to the user's geographic location) department store), as discussed herein in relation to the steps of Process 600. In some embodiments, the identification of the context from Step 604 can occur before, during and/or after the analysis detailed above with respect to Process 400 (and its sub-parts), or some combination thereof.

In Step 606, the determined context is communicated (or shared) with an advertisement platform comprising an advertisement server 130 and ad database. Upon receipt of the context, the advertisement server 130 performs (e.g., is caused to perform as per instructions received from the device executing the chatbot engine 300) a search for a relevant advertisement within the associated ad database. The search for an advertisement is based at least on the identified context.

In Step 608, the advertisement server 130 searches the ad database for a digital advertisement(s) that matches the identified context. In Step 610, an advertisement is selected (or retrieved) based on the results of Step 608. In some embodiments, the selected advertisement can be modified to conform to attributes or capabilities of the page, interface, message, platform, application or method upon which the advertisement will be displayed, and/or to the application and/or device for which it will be displayed. In some embodiments, the selected advertisement is shared or communicated via the application the user is utilizing to search, view and/or render the chatbot response. Step 612. In some embodiments, the selected advertisement is displayed within a portion of the interface or within an overlaying or pop-up interface associated with the interface used to enter the query and receive/output the chatbot response.

Figure 7:
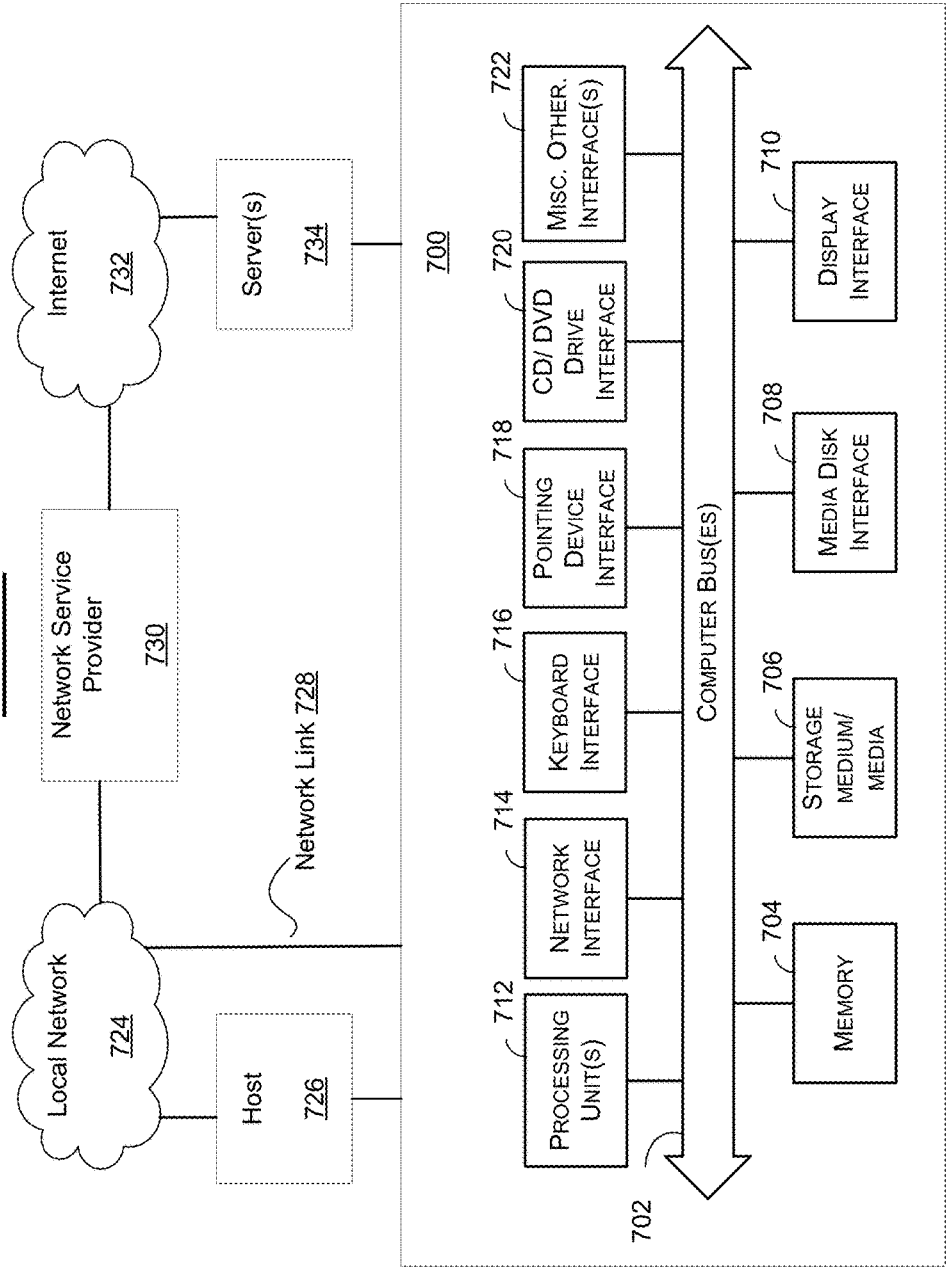
FIG. 7 is a block diagram illustrating the architecture of an exemplary hardware device in accordance with one or more embodiments of the present disclosure.

As shown in FIG. 7, internal architecture 700 of a computing device(s), computing system, computing platform and the like includes one or more processing units, processors, or processing cores, (also referred to herein as CPUs) 712, which interface with at least one computer bus 702. Also interfacing with computer bus 702 are computer-readable medium, or media, 706, network interface 714, memory 704, e.g., random access memory (RAM), run-time transient memory, read only memory (ROM), media disk interface 708 and/or media disk drive interface 720 as an interface for a drive that can read and/or write to media including removable media such as floppy, CD-ROM, DVD, media, display interface 710 as interface for a monitor or other display device, keyboard interface 716 as interface for a keyboard, pointing device interface 718 as an interface for a mouse or other pointing device, and miscellaneous other interfaces 722 not shown individually, such as parallel and serial port interfaces and a universal serial bus (USB) interface.

Memory 704 interfaces with computer bus 702 so as to provide information stored in memory 704 to CPU 712 during execution of software programs such as an operating system, application programs, device drivers, and software modules that comprise program code, and/or computer executable process steps, incorporating functionality described herein, e.g., one or more of process flows described herein. CPU 712 first loads computer executable process steps from storage, e.g., memory 704, computer readable storage medium/media 706, removable media drive, and/or other storage device. CPU 712 can then execute the stored process steps in order to execute the loaded computer-executable process steps. Stored data, e.g., data stored by a storage device, can be accessed by CPU 712 during the execution of computer-executable process steps.

Persistent storage, e.g., medium/media 706, can be used to store an operating system and one or more application programs. Persistent storage can also be used to store device drivers, such as one or more of a digital camera driver, monitor driver, printer driver, scanner driver, or other device drivers, web pages, content files, playlists and other files. Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

Network link 728 typically provides information communication using transmission media through one or more networks to other devices that use or process the information. For example, network link 728 may provide a connection through local network 724 to a host computer 726 or to equipment operated by a Network or Internet Service Provider (ISP) 730. ISP equipment in turn provides data communication services through the public, worldwide packet-switching communication network of networks now commonly referred to as the Internet 732.

A computer called a server host 734 connected to the Internet 732 hosts a process that provides a service in response to information received over the Internet 732. For example, server host 734 hosts a process that provides information representing image and/or video data for presentation at display 710. It is contemplated that the components of system 700 can be deployed in various configurations within other computer systems, e.g., host and server.

At least some embodiments of the present disclosure are related to the use of computer system 700 for implementing some or all of the techniques described herein. According to one embodiment, those techniques are performed by computer system 700 in response to processing unit 712 executing one or more sequences of one or more processor instructions contained in memory 704. Such instructions, also called computer instructions, software and program code, may be read into memory 704 from another computer-readable medium 706 such as storage device or network link. Execution of the sequences of instructions contained in memory 704 causes processing unit 712 to perform one or more of the method steps described herein. In alternative embodiments, hardware, such as ASIC, may be used in place of or in combination with software. Thus, embodiments of the present disclosure are not limited to any specific combination of hardware and software, unless otherwise explicitly stated herein.

The signals transmitted over network link and other networks through communications interface, carry information to and from computer system 700. Computer system 700 can send and receive information, including program code, through the networks, among others, through network link and communications interface. In an example using the Internet, a server host transmits program code for a particular application, requested by a message sent from computer, through Internet, ISP equipment, local network and communications interface. The received code may be executed by processor 702 as it is received, or may be stored in memory 704 or in storage device or other non-volatile storage for later execution, or both.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising:
   receiving, at a computing device, a request from a user, said request input by the user respective to a chatbot provided by the computing device, said request comprising a sequence of words;
   searching, via the computing device, a database based on said request, said search comprising identifying, within said database, a first response comprising a sequence of words;
   tokenizing, via the computing device, said first response, said tokenizing comprising identifying each identified word from said tokenizing of the first response as a token and tagging each token;
   creating, via the computing device, a set of bigrams based at least in part upon the tokenized first response, said bigrams comprising adjacent words in said first response;
   determining, via the computing device, a set of word patterns between each bigram based on a domain word-graph, said domain word-graph comprising nodes and edges, wherein each node corresponds to a word and each edge is a directional link between the nodes, said determination comprising determining a path within said domain word-graph between the words in each bigram, and identifying, based on said determined path, a set of word patterns along the path for each bigram;
   computing, via the computing device, scores for each word pattern in said set of word patterns, said computed scores indicating a co-occurrences, contextual similarity and linguistic quality between the words in the bigrams and the word patterns;
   selecting, via the computing device, a word pattern based on the computed scores;
   modifying, via the computing device, the first response by inserting the word pattern into said first response based on the bigram from which it was identified, said modification causing the creation of a second response; and
   communicating, via the computing device, said second response to said user in response to said request, for display of said communicated second response within a user interface (UI) associated with the chatbot.

2. The method of claim 1, further comprising:
   searching a repository of synonymous words based on said first response;
   identifying, based on said search, a set of synonyms for each word in the first response.

3. The method of claim 2, wherein said created set of bigrams includes the identified set of synonyms, wherein said set of word patterns determination is based on said bigram set that includes the identified set of synonyms.

4. The method of claim 1, wherein said computation of said co-occurrence score comprises:
   computing a co-occurrence score for each pair of words in said word patterns; and
   computing an average score based on each co-occurrence score.

5. The method of claim 4, wherein said computation of said co-occurrence score corresponds to a computation of weights of each edge between each pair, wherein said weight computation comprises:

$$W(e_{ij}) = \frac{freq(w_i w_j)}{freq(w_i) * freq(w_j)},$$

wherein $W(e_{ij})$ denotes a weight of edge e, between nodes i and j with corresponding tokens $w_1$ and $w_2$, respectively;
wherein freq denotes the frequency;
wherein the numerator computes a frequency of co-occurrence of tokens $w_1$ and $w_2$; and
wherein the denominator computes unigram frequencies of $w_1$ and $w_2$.

6. The method of claim 1, wherein said computation of said contextual similarity comprises:
   computing a cosine similarity between a paragraph vector of the first response and a paragraph vector of each word pattern;
   ranking cosine similarities of each word pattern, wherein said selected word pattern is within a predetermined number of top ranked patterns.

7. The method of claim 1, wherein said computation of said linguistic quality comprises:
   computing a score of linguistic confidence based on at least one language trained model; and
   determining, based on the linguistic confidence scores, a probability for each word pattern.

8. The method of claim 1, further comprising:
   determining a dependency parser confidence score which provides an indication of overall grammaticality of each word pattern, said computation of the dependency parser confidence score comprising:

$$F = D(k) * y_k + \sum_{i,j \in k, j=i+1} I(p_{ij}^q) * Sim(p_{ij}^q) * LQ(p_{ij}^q)) * p_{ij}^q,$$

wherein D(k) is the dependency parser confidence score for each word pattern; and wherein a number of word patterns for said D(k) computation is dependent on a number of words in the first response and a number of patterns between each pair of words.

9. The method of claim 1, wherein said tagging is performed by the computing device executing a part-of-speech (POS) tagger associated with said domain.

10. The method of claim 1, further comprising:
identifying a domain corresponding to said request, wherein said domain word-graph is associated with said identified domain, said domain related to a type of personality of speech.

11. The method of claim 1, further comprising:
determining a context based on said second response;
causing communication, over the network, of said context to a third party content platform to obtain a digital content item comprising third party digital content associated with said context;
receiving, over the network, said digital content item; and
causing display said digital content item in association with the communication of said second response.

12. A non-transitory computer-readable storage medium tangibly encoded with computer-executable instructions, that when executed by a processor associated with a computing device, performs a method comprising:
receiving, at the computing device, a request from a user, said request input by the user respective to a chatbot provided by the computing device, said request comprising a sequence of words;
searching, via the computing device, a database based on said request, said search comprising identifying, within said database, a first response comprising a sequence of words;
tokenizing, via the computing device, said first response, said tokenizing comprising identifying each identified word from said tokenizing of the first response as a token and tagging each token;
creating, via the computing device, a set of bigrams based at least in part upon the tokenized first response, said bigrams comprising adjacent words in said first response;
determining, via the computing device, a set of word patterns between each bigram based on a domain word-graph, said domain word-graph comprising nodes and edges, wherein each node corresponds to a word and each edge is a directional link between the nodes, said determination comprising determining a path within said domain word-graph between the words in each bigram, and identifying, based on said determined path, a set of word patterns along the path for each bigram;
computing, via the computing device, scores for each word pattern in said set of word patterns, said computed scores indicating a co-occurrences, contextual similarity and linguistic quality between the words in the bigrams and the word patterns;
selecting, via the computing device, a word pattern based on the computed scores;
modifying, via the computing device, the first response by inserting the word pattern into said first response based on the bigram from which it was identified, said modification causing the creation of a second response; and
communicating, via the computing device, said second response to said user in response to said request, for display of said communicated second response within a user interface (UI) associated with the chatbot.

13. The non-transitory computer-readable storage medium of claim 12, further comprising:
searching a repository of synonymous words based on said first response;
identifying, based on said search, a set of synonyms for each word in the first response, wherein said created set of bigrams includes the identified set of synonyms, wherein said set of word patterns determination is based on said bigram set that includes the identified set of synonyms.

14. The non-transitory computer-readable storage medium of claim 12, wherein said computation of said co-occurrence score comprises:
computing a co-occurrence score for each pair of words in said word patterns; and
computing an average score based on each co-occurrence score.

15. The non-transitory computer-readable storage medium of claim 14, wherein said computation of said co-occurrence score corresponds to a computation of weights of each edge between each pair, wherein said weight computation comprises:

$$W(e_{ij}) = \frac{freq(w_i w_j)}{freq(w_i) * freq(w_j)},$$

wherein $W(e_{ij})$ denotes a weight of edge $e_{ij}$ between nodes i and j with corresponding tokens $w_1$ and $w_2$, respectively;
wherein freq denotes the frequency;
wherein the numerator computes a frequency of co-occurrence of tokens $w_1$ and $w_2$; and
wherein the denominator computes unigram frequencies of $w_1$ and $w_2$.

16. The non-transitory computer-readable storage medium of claim 12, wherein said computation of said contextual similarity comprises:
computing a cosine similarity between a paragraph vector of the first response and a paragraph vector of each word pattern;
ranking cosine similarities of each word pattern, wherein said selected word pattern is within a predetermined number of top ranked patterns.

17. The non-transitory computer-readable storage medium of claim 12, wherein said computation of said linguistic quality comprises:
computing a score of linguistic confidence based on at least one language trained model; and
determining, based on the linguistic confidence scores, a probability for each word pattern.

18. The non-transitory computer-readable storage medium of claim 12, further comprising:
determining a dependency parser confidence score which provides an indication of overall grammaticality of each word pattern, said computation of the dependency parser confidence score comprising:

$$F = D(k) * y_k + \sum_{i,j \in k, j=i+1} I(p_{ij}^q) * Sim(p_{ij}^q) * LQ(p_{ij}^q)) * p_{ij}^q,$$

wherein D(k) is the dependency parser confidence score for each word pattern; and wherein a number of word patterns for said D(k) computation is dependent on a number of words in the first response and a number of patterns between each pair of words.

19. A computing device comprising:

a processor;

a non-transitory computer-readable storage medium for tangibly storing thereon program logic for execution by the processor, the program logic comprising:

logic executed by the processor for receiving, at the computing device, a request from a user, said request input by the user respective to a chatbot provided by the computing device, said request comprising a sequence of words;

logic executed by the processor for searching, via the computing device, a database based on said request, said search comprising identifying, within said database, a first response comprising a sequence of words;

logic executed by the processor for tokenizing, via the computing device, said first response, said tokenizing comprising identifying each identified word from said tokenizing of the first response as a token and tagging each token;

logic executed by the processor for creating, via the computing device, a set of bigrams based at least in part upon the tokenized first response, said bigrams comprising adjacent words in said first response;

logic executed by the processor for determining, via the computing device, a set of word patterns between each bigram based on a domain word-graph, said domain word-graph comprising nodes and edges, wherein each node corresponds to a word and each edge is a directional link between the nodes, said determination comprising determining a path within said domain word-graph between the words in each bigram, and identifying, based on said determined path, a set of word patterns along the path for each bigram;

logic executed by the processor for computing, via the computing device, scores for each word pattern in said set of word patterns, said computed scores indicating a co-occurrences, contextual similarity and linguistic quality between the words in the bigrams and the word patterns;

logic executed by the processor for selecting, via the computing device, a word pattern based on the computed scores;

logic executed by the processor for modifying, via the computing device, the first response by inserting the word pattern into said first response based on the bigram from which it was identified, said modification causing the creation of a second response; and logic executed by the processor for communicating, via the computing device, said second response to said user in response to said request, for display of said communicated second response within a user interface (UI) associated with the chatbot.

* * * * *